US011062272B2

(12) United States Patent
Ghatak et al.

(10) Patent No.: US 11,062,272 B2
(45) Date of Patent: Jul. 13, 2021

(54) RECOMMENDING MEETING SPACES USING AUTOMATICALLY-GENERATED VISIT DATA, WITH GEO-TAGGING OF THE MEETING SPACES

(71) Applicant: Microsoft Technology Licensing, LLC, Redmond, WA (US)

(72) Inventors: Kausik Ghatak, Bengaluru (IN); Manish Kataria, Bengaluru (IN); Shabaz Ahmed, Bengaluru (IN)

(73) Assignee: Microsoft Technology Licensing, LLC, Redmond, WA (US)

(*) Notice: Subject to any disclaimer, the term of this patent is extended or adjusted under 35 U.S.C. 154(b) by 129 days.

(21) Appl. No.: 16/511,016

(22) Filed: Jul. 15, 2019

(65) Prior Publication Data

US 2021/0019709 A1    Jan. 21, 2021

(51) Int. Cl.
| | |
|---|---|
| *G06Q 10/10* | (2012.01) |
| *G06F 16/909* | (2019.01) |
| *G06F 16/9035* | (2019.01) |
| *G06F 3/0482* | (2013.01) |
| *H04L 12/18* | (2006.01) |
| *H04L 29/06* | (2006.01) |
| *H04W 4/021* | (2018.01) |

(52) U.S. Cl.
CPC ....... *G06Q 10/1095* (2013.01); *G06F 3/0482* (2013.01); *G06F 16/909* (2019.01); *G06F 16/9035* (2019.01); *H04L 12/1818* (2013.01); *H04L 63/107* (2013.01); *H04W 4/021* (2013.01)

(58) Field of Classification Search
CPC .......... G06Q 10/00–50/00; G06F 1/00–40/00; H04L 1/00–69/00; H04W 4/00; H04W 88/00
USPC ................................................ 705/7.11–7.42
See application file for complete search history.

(56) References Cited

U.S. PATENT DOCUMENTS

| | | | | |
|---|---|---|---|---|
| 8,036,679 | B1 * | 10/2011 | Barbeau ................ | H04W 4/029 455/456.1 |
| 8,588,870 | B1 * | 11/2013 | Vargantwar ....... | H04M 1/72457 455/574 |

(Continued)

OTHER PUBLICATIONS

PCT Search Report and Written Opinion in PCT/US2019/063826, dated Mar. 20, 2020, 14 pages.

(Continued)

*Primary Examiner* — Alan S Miller

(57) ABSTRACT

A computer-implemented technique is described herein for scheduling events. The technique involves recommending one or more candidate spaces (e.g., candidate meeting rooms) based on a selected visit profile for each attendee to the event. More specifically, the technique selects a visit profile for each attendee from a group including a live visit profile, a short-term visit profile, and a long-term visit profile. Each such visit profile describes one or more visits made by the attendee within a prescribed timespan. The technique captures visit data for each such visit based on movement-related signals provided by one or more movement-determining mechanisms. A mobile computing device provides at least one movement-determining mechanism. In a preliminary phase, the technique can identify the geographical position of each candidate meeting space using a crowdsourcing operation.

20 Claims, 10 Drawing Sheets

(56) References Cited

U.S. PATENT DOCUMENTS

| | | | |
|---|---|---|---|
| 8,832,301 B2* | 9/2014 | Graff | G06F 16/9537 709/231 |
| 9,721,305 B2 | 8/2017 | Bomze et al. | |
| 2003/0204474 A1* | 10/2003 | Capek | G06Q 20/382 705/64 |
| 2004/0093290 A1* | 5/2004 | Doss | G06Q 10/1095 705/35 |
| 2007/0072583 A1 | 3/2007 | Barbeau et al. | |
| 2007/0088834 A1 | 4/2007 | Litovski et al. | |
| 2007/0184836 A1* | 8/2007 | He | H04W 52/0245 455/434 |
| 2007/0264969 A1* | 11/2007 | Frank | H04W 4/21 455/404.2 |
| 2010/0228469 A1* | 9/2010 | Varadarajan | G01C 21/32 701/532 |
| 2011/0117934 A1* | 5/2011 | Mate | H04W 24/00 455/456.3 |
| 2011/0184772 A1* | 7/2011 | Norton | G06Q 10/1093 705/7.18 |
| 2013/0080204 A1* | 3/2013 | Khorashadi | H04W 4/021 705/7.19 |
| 2013/0090151 A1* | 4/2013 | Ngai | H04W 52/0254 455/574 |
| 2013/0091279 A1 | 4/2013 | Haddad et al. | |
| 2013/0103764 A1 | 4/2013 | Verkasalo | |
| 2013/0282421 A1* | 10/2013 | Graff | H04L 63/08 705/7.18 |
| 2014/0006518 A1* | 1/2014 | Sinkov | H04L 51/32 709/205 |
| 2014/0058768 A1* | 2/2014 | Moxley | G06Q 50/01 705/5 |
| 2014/0058778 A1* | 2/2014 | Mclarty | G06Q 10/1095 705/7.19 |
| 2014/0171064 A1 | 6/2014 | Das | |
| 2014/0310366 A1* | 10/2014 | Fu | H04L 51/04 709/206 |
| 2015/0018014 A1* | 1/2015 | Phan | H04W 4/027 455/456.3 |
| 2015/0120336 A1* | 4/2015 | Grokop | G06Q 40/08 705/4 |
| 2015/0120555 A1* | 4/2015 | Jung | G06Q 20/384 705/44 |
| 2015/0193819 A1* | 7/2015 | Chang | G06Q 10/1095 705/7.19 |
| 2015/0198722 A1 | 7/2015 | Ben-Akiva et al. | |
| 2015/0199651 A1* | 7/2015 | Raman | G06Q 10/1095 705/7.19 |
| 2015/0288829 A1 | 10/2015 | Lu et al. | |
| 2015/0356516 A1* | 12/2015 | Kagan | G06Q 10/1095 705/7.19 |
| 2016/0300263 A1* | 10/2016 | Priness | H04W 4/029 |
| 2016/0321551 A1* | 11/2016 | Priness | G06Q 10/00 |
| 2017/0193455 A1* | 7/2017 | Galvin, Jr. | G06F 16/245 |
| 2017/0372254 A1* | 12/2017 | Vainas | G06Q 10/1093 |
| 2018/0082206 A1 | 3/2018 | Yang et al. | |
| 2018/0114148 A1 | 4/2018 | Balaji et al. | |
| 2018/0115866 A1* | 4/2018 | Gonzalez | G06F 1/3293 |

OTHER PUBLICATIONS

Ghatak, et al., "Computer-Implemented Detection of a Work-Related Visit Based on Data from Movement-Sensing Mechanism(s)," U.S. Appl. No. 16/213,264, filed Dec. 7, 2018, 75 pages.

"MileIQ: How it Works," available at <<https://www.mileiq.com/howitworks>>, Microsoft Corporation, Redmond, WA, accessed on Mar. 24, 2019, 12 pages.

Krumm, et al., "LOCADIO: Inferring Motion and Location from Wi-Fi Signal Strengths," in Proceedings of the First Annual International Conference on Mobile and Ubiquitous Systems: Networking and Services (MOBIQUITOUS 2004), 2004, 10 pages.

Polgar, David Ryan, "Will AI Assistants Save Us From Administrative Tedium?," available at <<https://www.delltechnologies.com/en-us/perspectives/will-ai-assistants-save-us-from-administrative-tedium/>>, Dell Inc., Round Rock, TX, Apr. 4, 2018, 9 pages.

Rodriguez, Salvador, "Facebook's former CIO was told to fix its calendar system, or else—now, his new start-up aims to solve the same problem for everybody," available at <<https://www.cnbc.com/2018/11/08/facebooks-former--cio-tim-campos-launches-calendar-start-up-woven.html>>, CNBC, Nov. 8, 2018, 10 pages.

"Experience Autonomous Scheduling," available at <<https://x.ai/?cn-reloaded=1>>, x.ai, inc., New York, NY, accessed on Jul. 16, 2019, 4 pages.

PCT Search Report and Written Opinion for PCT/US2020/034730, dated Aug. 25, 2020, 14 pages.

* cited by examiner

OVERVIEW OF A CROWDSOURCING OPERATION
1302

COLLECT A SET OF INSTANCES OF MOVEMENT-RELATED INFORMATION CAPTURED WHEN ONE OR MORE INDIVIDUALS HAVE VISITED A MEETING SPACE, EACH INSTANCE OF MOVEMENT-RELATED INFORMATION INCLUDING ONE OR MORE MOVEMENT-RELATED VALUES CAPTURED BY ONE OR MORE MOVEMENT-DETERMINING MECHANISMS, AT LEAST ONE MOVEMENT-DETERMINING MECHANISM BEING ASSOCIATED WITH A MOBILE A COMPUTING DEVICE THAT ACCOMPANIES THE INDIVIDUAL AS THE INDIVIDUAL VISITS THE MEETING SPACE.
1304

IDENTIFY A GROUP OF VALUES THAT IS MOST PREVALENT WITHIN THE SET OF INSTANCES OF POSITION-RELATED INFORMATION.
1306

DETERMINE THE GEOGRAPHICAL POSITION OF THE MEETING SPACE BASED ON THE GROUP OF VALUES THAT IS MOST PREVALENT.
1308

FIG. 13

RECOMMENDING MEETING SPACES USING AUTOMATICALLY-GENERATED VISIT DATA, WITH GEO-TAGGING OF THE MEETING SPACES

BACKGROUND

Users commonly rely on various types of computer-implemented scheduling systems to set up meetings and other events. But a meeting organizer may encounter difficulties even with the assistance of such a system. For example, the organizer may have poor knowledge of the layout of a particular building complex in which a meeting is to be held. The organizer may also lack a full understanding of the diverse location-related preferences of the meeting's attendees. These factors makes it difficult for the organizer to choose a suitable meeting room for the meeting. The organizer may address this challenge by performing a computer-implemented search to find information regarding the meeting rooms in a building of interest. The organizer may also engage in an extended dialogue with the attendees using an Email application to discover their preferences. Such a process is inefficient, however, in terms of both the expenditure of time and computing resources. For example, this process requires the organizer to perform multiple input actions. Some computer-implemented scheduling systems offer meeting room suggestions that match rooms that the organizer has recently selected in prior scheduling sessions. But this does not help the organizer when his or her current needs differ from those associated with the prior scheduling sessions.

SUMMARY

A computer-implemented technique is described herein for scheduling events. The technique involves recommending one or more candidate meeting spaces (e.g., candidate meeting rooms) based on a selected visit profile for each attendee to the event. The visit profile describes one or more visits made by the attendee within a prescribed timespan. The technique automatically captures visit data for each such visit based on movement-related signals provided by one or more movement-determining mechanisms. At least one movement-determining mechanism is provided by a mobile a computing device carried by the attendee as he or she moves, or which otherwise accompanies the attendee as he or she moves. A mobile computing device, as the term is used herein, refers to any computing device that is designed to be carried by the user, or which otherwise accompanies the user as he or she moves. Without limitation, the mobile computing device may correspond to a smartphone, a tablet-type computing device, a laptop computing device, a portable game device, a wearable computing device, a mixed-reality device, a media consumption device, etc.

In one implementation, the technique selects the visit profile from plural visit profiles associated with an attendee. The plural visit profiles include: a live visit profile that describes a current visit being made by the individual or a last visit made by the attendee (if the user is currently in motion); a short-term visit profile that describes a subset of visits made by the attendee over a first span of time ending at a current time; and a long-term visit profile that describes another (larger) subset of visits made by the attendee over a second span of time ending at the current time. That is, the second span of time is longer than the first span of time. For example, without limitation, the second time span may correspond to five days of visit data, while the third time span may correspond to two months of visit data.

In one implementation, the technique selects the visit profile by: selecting the live visit profile for an attendee when an organizer-selected meeting time is separated from the current time by a first time offset or less (such as two hours); selecting the short-term visit profile for an attendee when the meeting time is separated from the current time by a second time offset or less (such as two days), but no sooner than the first time offset; and selecting the long-term visit profile for an attendee when the meeting time is separated from the current time by a time offset that is greater than the second time offset. The technique also selects the long-term visit profile when the meeting is designated as a recurring event, as opposed to a single-occurrence event. More generally, the technique can select a visit profile for a proposed meeting based on plural characteristics regarding the meeting, including, but not limited to, its time of occurrence, its recurring/non-occurring status, etc.

According to another illustrative aspect, the technique can also choose one or more candidate meeting spaces based on the geographical position associated with each meeting space. The technique identifies the geographical position, in turn, using a crowdsourcing operation, which the technique can perform as a background process. The crowdsourcing operation includes collecting a set of instances of position-related information captured during one or more prior visits to the meeting space by one or more attendees. Each instance of position-related information includes a group of one or more movement-related values captured by one or more movement-determining mechanisms at a meeting, while a particular attendee participates in the meeting in the meeting space. The technique identifies a group of values that is most prevalent within the set of instances of position-related information, and then determines the geographical position of the meeting space based on the identified most-prevalent group of values.

Among its technical advantages, the technique has the net effect of reducing the number of ad hoc computer operations that an organizer needs to perform in setting up a meeting event. The technique is also efficient from a resource consumption standpoint because it foregoes the consumption of resources that the ad hoc computer operations would otherwise incur.

The above-summarized technique can be manifested in various types of systems, devices, components, methods, computer-readable storage media, data structures, graphical user interface presentations, articles of manufacture, and so on.

This Summary is provided to introduce a selection of concepts in a simplified form; these concepts are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

FIG. 13 is a flowchart that provides an overview of a crowdsourcing operation performed by the crowdsourcing tool of FIG. 4.

Figure 1:
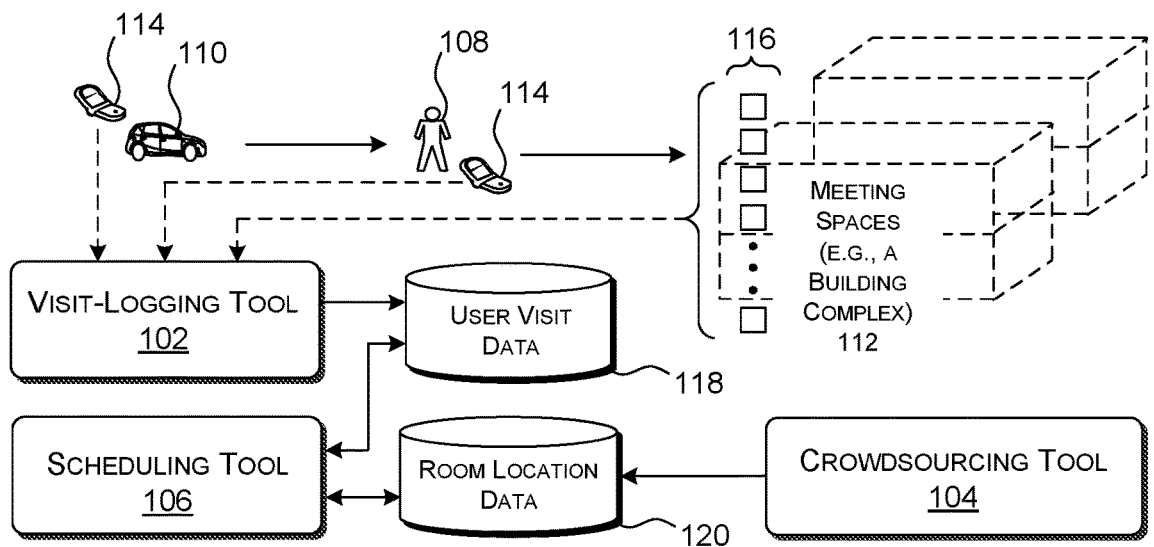
FIG. 1 shows an example in which a visit-logging tool records visit data that describes a visit made by a user. A crowdsourcing tool provides room location data. A scheduling tool sets up events based on visit data collected over a span time, in conjunction with the room location data.

The same numbers are used throughout the disclosure and figures to reference like components and features. Series 100 numbers refer to features originally found in FIG. 1, series 200 numbers refer to features originally found in FIG. 2, series 300 numbers refer to features originally found in FIG. 3, and so on.

DETAILED DESCRIPTION

This disclosure is organized as follows. Section A describes a computing environment for setting up a meeting event and for geo-tagging candidate meeting spaces. Section B sets forth illustrative methods that explain the operation of the computing environment of Section A. And Section C describes illustrative computing functionality that can be used to implement any aspect of the features described in Sections A and B.

As a preliminary matter, the term "hardware logic circuitry" corresponds to one or more hardware processors (e.g., CPUs, GPUs, etc.) that execute machine-readable instructions stored in a memory, and/or one or more other hardware logic units (e.g., FPGAs) that perform operations using a task-specific collection of fixed and/or programmable logic gates. Section C provides additional information regarding one implementation of the hardware logic circuitry. In some contexts, each of the terms "component," "engine," and "tool" refers to a part of the hardware logic circuitry that performs a particular function.

In one case, the illustrated separation of various parts in the figures into distinct units may reflect the use of corresponding distinct physical and tangible parts in an actual implementation. Alternatively, or in addition, any single part illustrated in the figures may be implemented by plural actual physical parts. Alternatively, or in addition, the depiction of any two or more separate parts in the figures may reflect different functions performed by a single actual physical part.

Other figures describe the concepts in flowchart form. In this form, certain operations are described as constituting distinct blocks performed in a certain order. Such implementations are illustrative and non-limiting. Certain blocks described herein can be grouped together and performed in a single operation, certain blocks can be broken apart into plural component blocks, and certain blocks can be performed in an order that differs from that which is illustrated herein (including a parallel manner of performing the blocks). In one implementation, the blocks shown in the flowcharts that pertain to processing-related functions can be implemented by the hardware logic circuitry described in Section C, which, in turn, can be implemented by one or more hardware processors and/or other logic units that include a task-specific collection of logic gates.

As to terminology, the phrase "configured to" encompasses various physical and tangible mechanisms for performing an identified operation. The mechanisms can be configured to perform an operation using the hardware logic circuitry of Section C. The term "logic" likewise encompasses various physical and tangible mechanisms for performing a task. For instance, each processing-related operation illustrated in the flowcharts corresponds to a logic component for performing that operation. A logic component can perform its operation using the hardware logic circuitry of Section C. When implemented by computing equipment, a logic component represents an electrical element that is a physical part of the computing system, in whatever manner implemented.

Any of the storage resources described herein, or any combination of the storage resources, may be regarded as a computer-readable medium. In many cases, a computer-readable medium represents some form of physical and tangible entity. The term computer-readable medium also encompasses propagated signals, e.g., transmitted or received via a physical conduit and/or air or other wireless medium, etc. However, the specific term "computer-readable storage medium" expressly excludes propagated signals per se, while including all other forms of computer-readable media.

The following explanation may identify one or more features as "optional." This type of statement is not to be interpreted as an exhaustive indication of features that may be considered optional; that is, other features can be considered as optional, although not explicitly identified in the text. Further, any description of a single entity is not intended to preclude the use of plural such entities; similarly, a description of plural entities is not intended to preclude the use of a single entity. Further, while the description may explain certain features as alternative ways of carrying out identified functions or implementing identified mechanisms, the features can also be combined together in any combination. Finally, the terms "exemplary" or "illustrative" refer to one implementation among potentially many implementations.

A. Illustrative Computing Environment

FIG. 1 shows an example in which a visit-logging tool 102 automatically records visit data that describes a visit made by a user. A crowdsourcing tool 104 provides room location data. A scheduling tool 106 sets up events based on visit data collected over a span time (provided by the visit-logging tool 102), in conjunction with the room location data (provided by the crowdsourcing tool 104).

The example of FIG. 1 involves the merely illustrative scenario in which a user 108 uses a vehicle 110 to drive to a building 112. The user parks her vehicle 110 in proximity to the building 112 and then walks to a meeting room in the building 112. More specifically, assume that the meeting room is located on the second floor of the south wing of a two-wing complex. At the meeting room, the user participates in a two-hour meeting with one or more others attendees. The user then retires to her office in the north wing of the building 112 where she begins interacting with a desktop computing device (not shown). During this sequence of events, the user carries at least one mobile computing device 114, such as a smartphone, a tablet-type computing device, a wearable computing device, etc. More generally, it may be said that the mobile computing device 114 accompanies the user during the course of her movement. A mobile computing device, as the term is used herein, refers to any computing device that is designed to be carried by the user, or which otherwise accompanies the user as he or she moves.

The mobile computing device 114 includes one or more movement-determining mechanisms that provide movement-related signals. Each movement-related signal corresponds to a transmission of movement-related information from a source to a destination over a communication conduit of any type. The movement-related information, in turn, describes the position and/or motion of the user at a given time. The visit-logging tool 102 automatically reconstructs the course of the user's above-described path through the physical environment based on the movement-related signals.

The movement-determining mechanisms provided by the mobile computing device 114 are most fully described below with reference to FIG. 5. By way of overview, the movement-determining mechanisms can include a global positioning system (GPS) device that determines the position of the mobile computing device 114 by triangulating signals received from GPS satellites. The movement-determining mechanisms can also include a device that determines the position of the mobile computing device 114 by processing signals received from terrestrial signal sources (such as cell towers, WI-FI access points, beacons, etc.). The movement-determining mechanisms can also include an altimeter that identifies the height of the mobile computing device with respect to a reference point. The movement-determining mechanisms can also include one or more accelerometers, one or more gyroscopes, one or more magnetometers, and so on.

Other movement-determining mechanisms operate from fixed respective positions in the physical environment, or which otherwise do not move with the user. For instance, the building 112 can include a set of movement capture mechanisms 116 that determine the presence of the user at various locations in the building 112. These mechanisms 116 include pressure sensors, optical detectors, video detectors, and so on. For instance, a room can include a pressure sensor in its floor that indicates when a user is standing on it. A doorway to the room can include an optical sensor that determines when a user passes through the door. An entranceway to the building 112 can include a video camera and associated face recognition component that determines the arrival of a particular person, and so on.

As will be described in greater detail below in connection with FIGS. 4 and 6, the visit-logging tool 102 analyzes the movement-related signals to determine visits made by a user. A visit generally corresponds to a span of time in which the user is considered to remain at a given location for more than a prescribed amount of time. For instance, the visit-logging tool 102 will determine that the user's meeting constitutes a first visit, and her subsequent work in her office constitutes a second visit. Each visit is demarcated by the user's arrival at a location, and the user's subsequent departure from that location.

The visit-logging tool 102 stores visit data that described each visit in a data store 118. For example, the visit data can specify a visit's starting time, ending time, duration, location coordinates (e.g., latitude, longitude, altitude), location name (if available), floor number (if available), room number (if available), etc. The visit-logging tool 102 can determine the name of a location by using a database that maps geographical coordinates (e.g., longitude and latitude coordinates) to place name information, if available. The visit data can also include supplemental data pertaining to a visit, such as notes created by the user during or after the visit.

An event organizer interacts with the scheduling tool 106 to set up an event. As part of its service, the scheduling tool 106 recommends one or more candidate meeting spaces in which to conduct the event. To facilitate explanation, the scheduling tool 106 will henceforth be described in the illustrative and non-limiting context of setting up a meeting. Further, the meeting spaces will henceforth be described in the context of candidate meeting rooms.

The scheduling tool 106 includes a service that partitions the visit data for each individual into two or more visit profiles. Each visit profile corresponds to a subset of visits made by the individual over a span of time. Different visit profiles are associated with different respective subsets of visits and different respective spans of time. In operation, the scheduling tool 106 selects a visit profile for each attendee of the meeting being scheduled, to overall provide visit profile information. The scheduling tool 106 then chooses one or more candidate meeting rooms based, in part, on the visit profile information. The scheduling tool 106 also recommends meeting rooms based on room location data stored in a data store 120. The room location data provides information regarding each meeting room, including its geographical location.

The crowdsourcing tool 104 uses a crowdsourcing operation to determine the geographical position of each meeting room. The crowdsourcing tool 104 may operate as a background service that is independent of the operation of the scheduling tool 106. In operation, the crowdsourcing tool 104 collects a set of instances of position-related information captured during one or more prior visits to a meeting room made by one or more individuals. Each instance of position-related information includes one or more movement-related values captured by the movement-determining mechanisms, such as an altitude reading, longitude and latitude readings, an identifier associated with a router that provides wireless communication in the meeting room, etc. Each such movement-related value provides evidence as to the geographical position of the meeting room. The crowdsourcing tool 104 then identifies a group values that is most prevalent within the set of instances of position-related information. It then uses that group of values to determine the geographical position of the meeting room.

Figure 2:
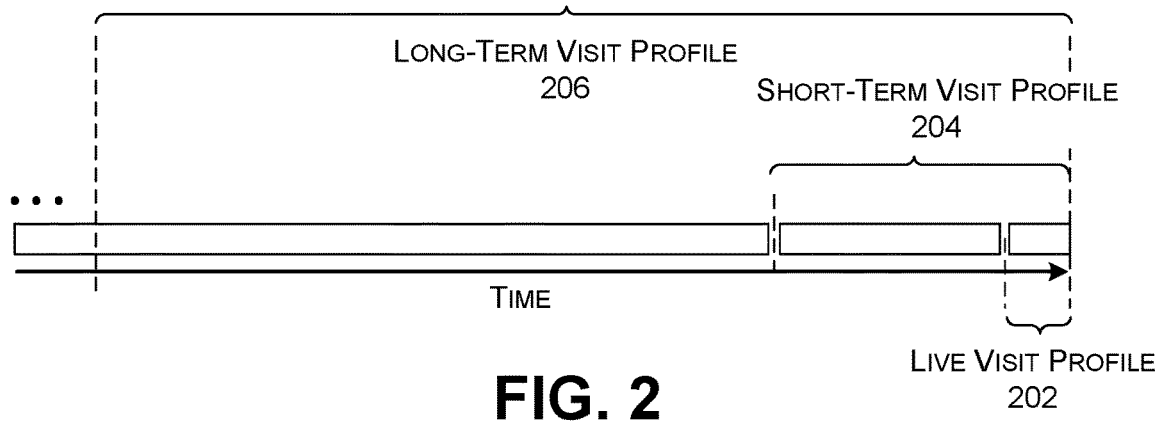
FIG. 2 show information regarding three visit profiles that the scheduling tool can use to recommend meeting spaces.

FIG. 2 show information regarding three visit profiles that the scheduling tool 106 can use to recommend meeting rooms. A live visit profile 202 represents an ongoing visit being made by the user. For example, assume that a user is currently sitting in her office. That behavior constitutes an ongoing visit, and the live profile 202 would identify the location of the user's office. A short-term visit profile 204 represents a subset of visits made by the user over a first span of time, such as the last five days. A long-term visit profile 206 presents a larger subset of visits made by the user over a longer span of time, such as two months. Other implementations can vary the timespans associated with these visit profiles in any manner to suit the characteristics of a particular environment in which the scheduling tool 106 is used.

Figure 3:
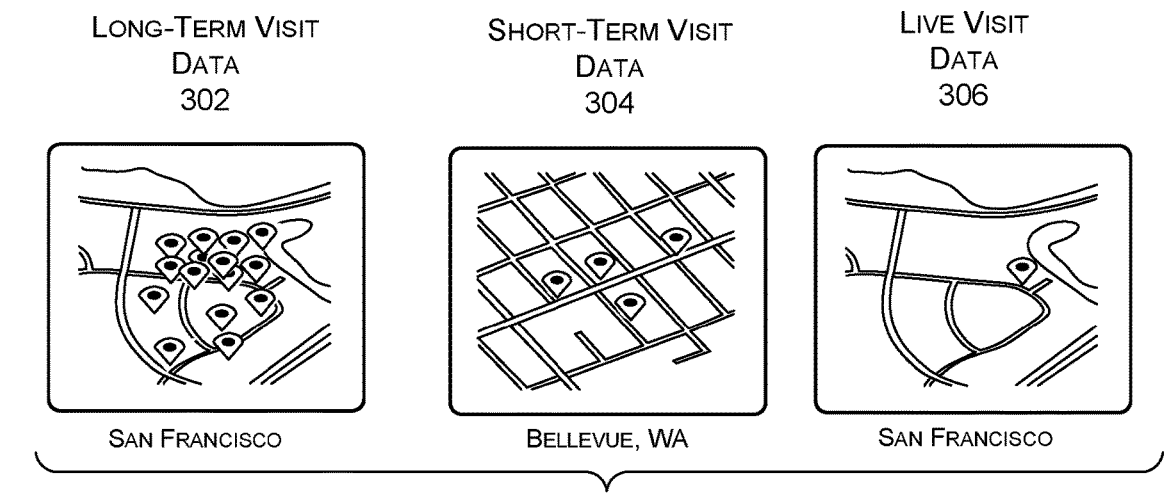
FIG. 3 shows an example of the three visit profiles shown in FIG. 2 for a particular individual.

FIG. 3 shows an example of the three visit profiles described above. More specifically, FIG. 3 shows a first map that shows the visit locations associated with long-term visit data 302, a second map that shows the visit locations associated with short-term visit data 304, and a third map that shows a single visit location associated with the live visit data 306. Assume, in this merely illustrative case, that the user normally works at a facility in San Francisco. Hence, the long-term visit data 302 will predominantly show visits made in San Francisco. But assume that the user visited another work facility in Bellevue, Wash. for a significant portion of the last five days. The short-term visit data 304 will emphasize that information. Finally, assume that the user returned to her office in San Francisco. The live visit data 306 will again reflect this fact. (Although not depicted in FIG. 3 for the sake of simplicity, note that the long-term visit data 302 will also include some location data associated with Bellevue, Wash.)

The scheduling tool 106 selects a visit profile for each attendee based on one or more factors. As one factor, the scheduling tool 106 chooses a visit profile for an attendee based on the date and time at which the proposed meeting is to occur relative to the current date and time. For example, in one case, the scheduling tool 106 selects the live visit profile when the organizer selects a meeting to occur two hours or less from the current time. The scheduling tool 106 selects the short-term profile when the organizer selects a meeting to occur two days or less from the current time (but not sooner than two hours from the current time). And the scheduling tool 106 selects the long-term profile when the organizer selects a meeting to occur beyond two days from the current time. Other implementations can vary the time offsets associated with the visit profiles in any manner to suit the characteristics of a particular environment in which the scheduling tool 106 is used. As another factor that overrides the first factor, the scheduling tool 106 selects the long-term profile when the organizer selects a recurring meeting, as opposed to a single-occurrence meeting.

The above-described rules operate to select a set of visits that best reflect the current meeting-related preferences and intents of the attendees of a meeting. For example, assume that the user is a San Francisco-resident employee who is currently conducting business in Bellevue, Wash. Further assume that the user, acting as an organizer, sets up a meeting to occur within two days of the current date, but no sooner than two hours. The scheduling tool 106 will recommend meeting rooms based on recent visits that the user made over the last five days in Bellevue, Wash., rather than the longer-term patterns of the user's conduct, which reveal that her home base is San Francisco. In other words, this rule prevents the user's long-term visit-related patterns from inappropriately biasing the room selection algorithm.

Next assume that the user sets up a meeting to occur more than two days from the current date, or the organizer sets up a recurring meeting. The scheduling tool 106 draws from the long-term visit profile in this case based on the default assumption that the most likely candidate rooms are reflected by the last two months of the attendee's visit-related behavior.

Next assume that the user chooses a meeting time to occur two hours or less from the current time. In this circumstance, the scheduling tool 106 draws from the live visit profile of the user because it is most likely that the user will be conducting the meeting from a location that is near her current location. This rule will also prevent the scheduling tool 106 from selecting a meeting location in San Francisco, when the user is currently located in Bellevue, Wash., or vice versa.

Overall, the scheduling tool 106 allows a meeting organizer to set up a meeting in an efficient manner because it provides a set of room recommendations that best match the likely preferences and intents of the attendees of the meeting. That is, in some cases, the scheduling tool 106 reduces the number of operations required to set up a meeting (compared to the case in which the above-described room-recommendation logic is not used). For instance, the scheduling tool 106 can eliminate or reduce the need to perform ad hoc research on a work environment prior to setting up a meeting. The scheduling tool 106 can also eliminate or reduce the need for sideband interaction among attendees prior to choosing a meeting place and time. These factors improve the scheduling experience offered to the organizer and the attendees. These factors also enable a more efficient use of computing resources. That is, by reducing the number of operations involved in setting up a meeting, the scheduling tool 106 will consume fewer computing resources.

Figure 4:
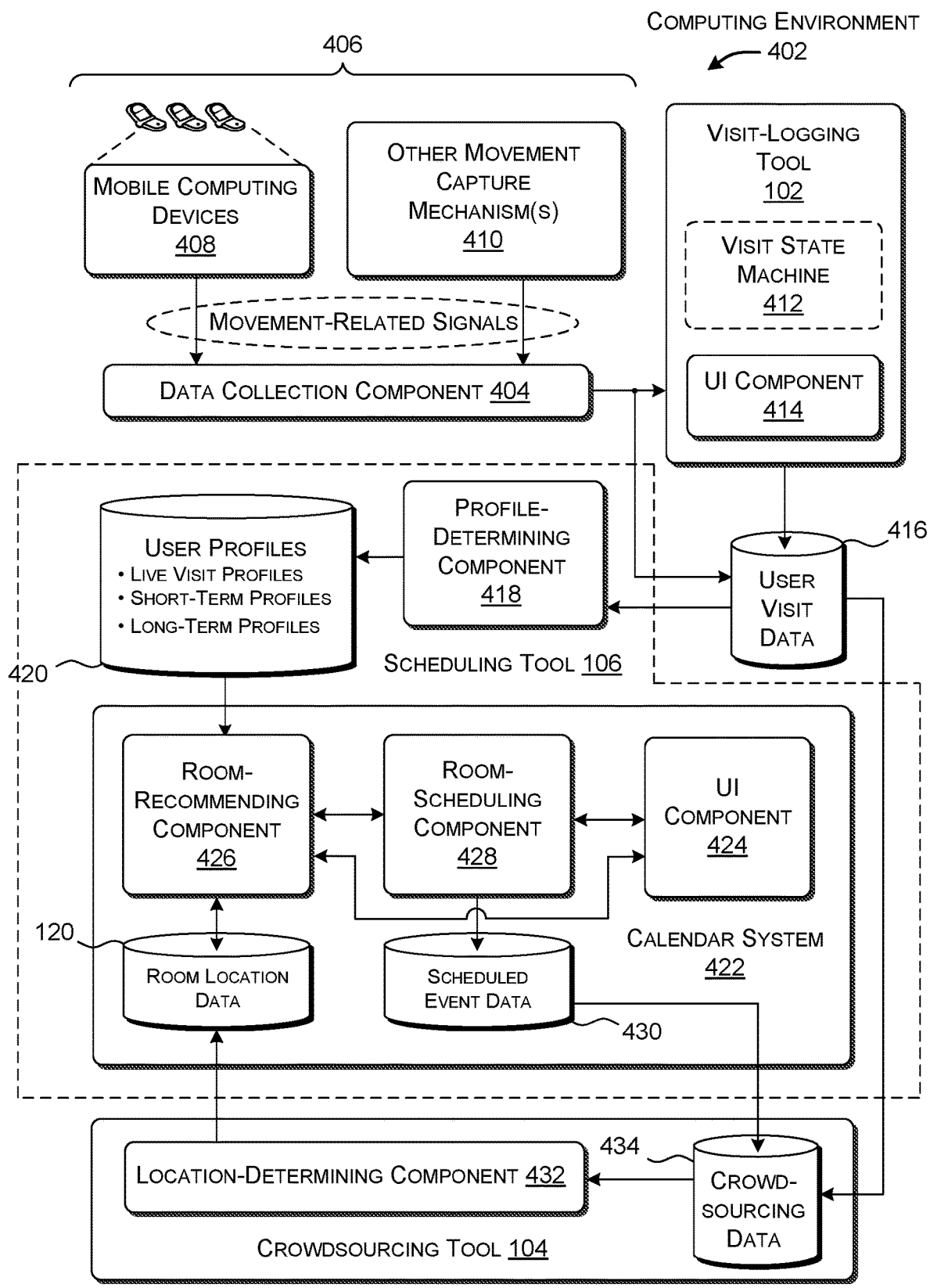
FIG. 4 shows an illustrative computing environment that includes the visit-logging tool, scheduling tool, and crowdsourcing tool introduced in FIG. 1.

FIG. 4 shows an illustrative computing environment 402 that includes a more detailed depiction of the visit-logging tool 102, the scheduling tool 106, and the crowdsourcing tool 104, introduced in FIG. 1. The computing environment 402 includes a data collection component 404 that collects movement-related signals from a plurality of movement-determining mechanisms 406. The movement-determining mechanisms 406 include devices provided by one or more mobile computing devices 408 carried by the users (or otherwise associated with the users) as they move within a physical environment. The movement-determining mechanisms 406 also include any other movement capture mechanisms 410, some of which may have fixed positions relative to the user. For example, the other movement-capture mechanisms 410 can include pressure sensors, optical sensors, video capture devices, etc., some of which may be installed within the building 112 (of FIG. 1).

The data collection component 404 can use a pull-based technique to collect the movement-related signals. In that case, the data collection component 404 actively polls the movement-determining mechanisms 406 to collect the movement-related signals. Alternatively, or in addition, the data collection component 404 can use a push-based technique to receive the movement-related signals. In that case, the data collection component 404 relies on the movement-determining mechanisms 406 to independently forward the movement-related signals to the data collection component 404. The data collection component 404 may represent an element that is part of the visit-logging tool 102, or an element that is external to the visit-logging tool 102.

The visit-logging tool 102 itself can include a visit state machine 412 to interpret the movement-related signals provided by the movement-determining mechanisms 406, and, based thereon, to determine when each user has made a visit. In one implementation, the visit state machine 412 includes an environment-specific set of rules that determine when a user has commenced a visit and when the user has subsequently ended a visit. The visit-logging tool 102 also includes a user interface (UI) component 414 that provides one or more UI presentations to the user. One such UI presentation shows visit-related information to the user regarding a visit detected by the visit-logging tool 102. That UI presentation also gives the user the opportunity to modify or supplement the visit information in any way, e.g., by correcting inaccurate data in the visit information, adding notes to the visit information, etc. Additional information regarding the operation of the visit-logging tool 102 will be provided below in connection with the explanation of FIGS. 6 and 7.

The visit-logging tool 102 stores visit data for each user in a data store 416. As described above, the visit data can provide salient information regarding each detected visit, such as the starting time of the visit, the ending time of the visit, the duration of the visit, the location of the visit, etc. The data store 416 can optionally also store all or some of the raw movement-related signals associated with each visit.

The scheduling tool 106 includes a profile-determining component 418 for providing a group of visit profiles associated with each user. As described above, each visit profile represents a subset of visits made by a user within a specified timeframe. The profile-determining component 418 can generate the visit profiles with reference to a configurable set of rules. For instance, the rules may specify the span of time associated with each visit profile. For example, a rule will indicate that the short-term visit profile is associated with visit activity that occurs within a five-day window. The rules may also specify the factor(s) and that determine when each visit profile will be invoked. For example, a rule will indicate that the short-term visit profile is triggered when an organizer sets up a meeting that is two days less than the current time, but no sooner than 2 hours from the current time. The profile-determining component 418 stores the thus-generated visit profiles in a data store 420. Collectively, the visit profiles are referred to herein as visit profile information.

More specifically, in one implementation, the profile-determining component 418 generates the various visit profiles as a background service, such that the visit profiles are available when needed. In another implementation, the profile-determining component 418 generates selected visit profiles on an as-needed basis, e.g., as requested by the room-recommending service provided by the scheduling tool 106, described next.

A calendar system 422 provides a service that allows a user to set up a meeting or other event. The calendar system 422 includes a UI component 424 that provides one or more UI presentations by which the organizer can interact with the calendar system 422. For instance, at least one UI presentation allows the organizer to input data regarding a meeting to be scheduled, e.g., by specifying the desired time, location, attendees, etc., of the meeting.

A room-recommending component 426 generates one or more room recommendations, and presents these recommendations to the organizer via the UI component 424. The room-recommending component 426 performs this task based on: the per-attendee visit profiles provided by the data store 420, the room location data provided in the data store 120, and the organizer input data provided by the UI component 424. Additional information regarding the operation of the room-recommending component 426 will be provided below in connection with the explanation of FIG. 9.

A room-scheduling component 428 performs other tasks associated with scheduling a meeting. These tasks include creating a meeting record in a data store 420, notifying the meeting attendees of the scheduled meeting, monitoring acceptance or rejection by the attendees of the meeting, reminding the attendees of the meeting a prescribed amount of time prior to the meeting, and so on.

Although not shown, the computing environment 402 can also include a configuration component. The configuration component allows an organizer and/or any attendee to store preference information that will govern the operation of the computing environment 402. For example, an attendee can store preference information that identifies the spans of time respectively associated with live visit profile, the short-term visit profile, and the long-term visit profile, with respect to this particular attendee. The attendee can also store preference information that identifies the trigger conditions that will invoke the live visit profile, the short-term visit profile, and the long-term visit profile, with respect to this particular attendee. Or an administrator can make these kinds of choices for groups of individuals, such as the employees of a particular work site, etc.

The crowdsourcing tool 104 operates as a background service that is independent of the scheduling tool 106. It includes a location-determining component 432 that determines the location of each meeting room based on crowdsourcing data in a data store 434. As described above, the crowdsourcing data includes a set of instances of position-related information for each meeting room. Each such instance of position-related information contains a bundle of movement-related values that have been captured when an attendee has visited a meeting room on a prior occasion to attend a scheduled meeting. That bundle collectively provides evidence as to the geographical position of the meeting room. The location-determining component 432 selects a group of values that is most prevalent in the set of instances of position-related information. In other words, the location-determining component 432 identifies the group of values that were most often captured during visits by attendees to the meeting room. The location-determining component 432 then generates the geographical position of the meeting room based on this identified value or values. Additional information regarding the operation of the crowdsourcing tool 104 will be provided below in connection with the explanation of FIG. 10.

Figure 5:
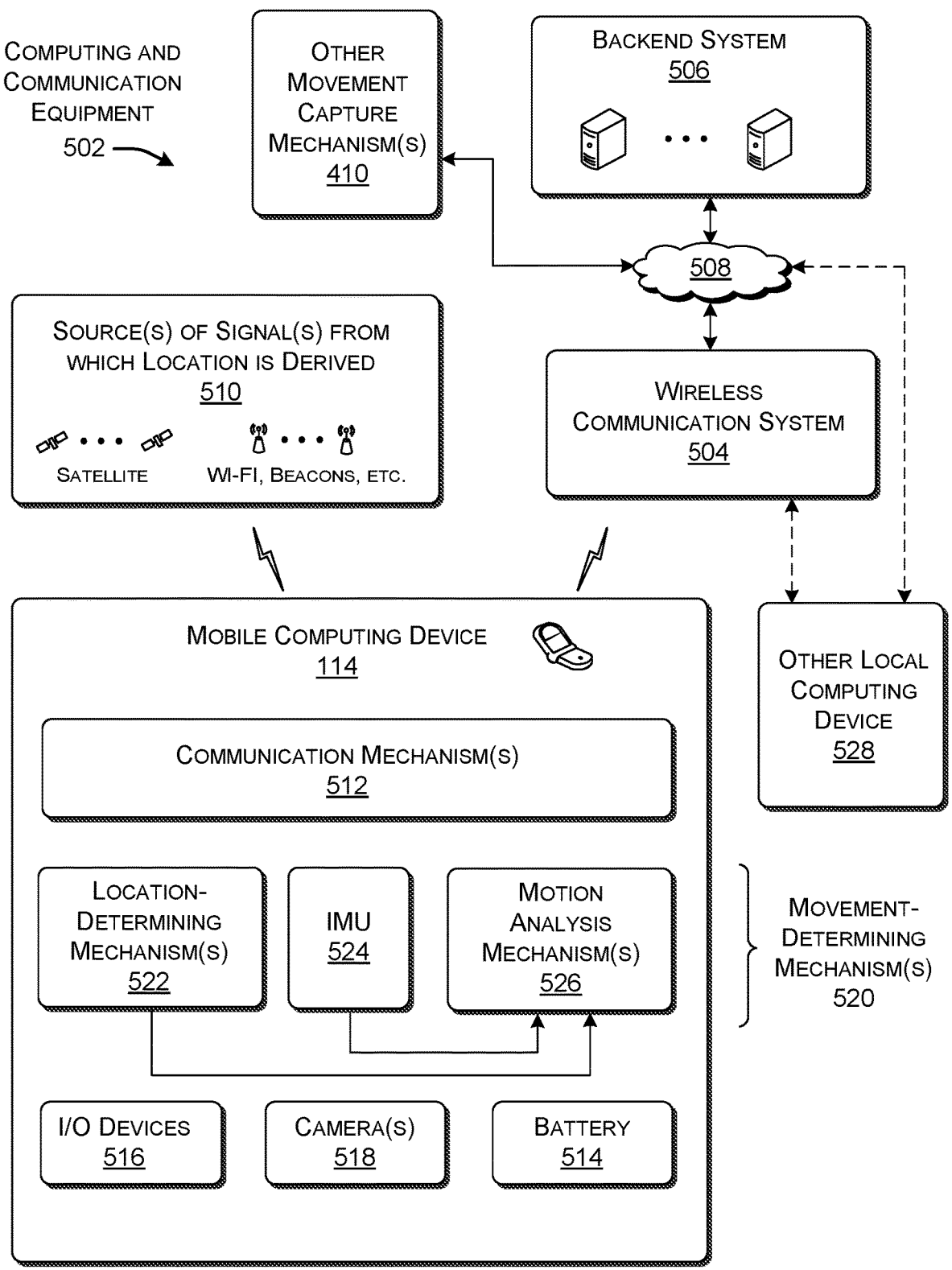
FIG. 5 shows computing and communication equipment that can be used to implement the computing environment of FIG. 4.

FIG. 5 shows one illustrative communication and computing equipment 502 that can be used to implement the computing environment 402 of FIG. 4. In this figure, at least one mobile computing device 114 interacts with a wireless communication system 504 via the exchange of wireless signals. Without limitation, the mobile computing device 114 may correspond to a smartphone, a tablet-type computing device, a laptop computing device, a portable game device, a wearable computing device, a mixed-reality device, a media consumption device, etc. The wireless communication system 504 can include a collection of wireless towers, one or more base stations, one or more central processing stations, etc.

The wireless communication system 504, in turn, may communicate with a backend system 506 via a computer network 508. The backend system 506 may be implemented by one or more servers, located at a single site, or distributed over plural sites. The computer network 508 may correspond to a local area network, a wide area network (e.g., the Internet), one or more point-to-point communication links, etc.

FIG. 5 also generally shows one or more sources 510 of signals from which location may be derived. For example, the source(s) 510 may include a set of Global Positioning System (GPS) satellites and associated equipment that provide GPS signals. The source(s) 510 may also include a set of WI-FI access points (e.g., wireless repeaters), BLUETOOTH beacons, etc. The source(s) 510 may also include a set of cell phone towers. The cell phone towers correspond to part of the wireless communication system 504. A database (not shown) stores the known locations of the WI-FI access points, beacons, cell phone towers, etc.

The mobile computing device 114 itself includes one or more communication mechanisms 512, a battery 514 (and/or other power source), one or more input devices and one or more output devices (abbreviated as "I/O devices") 516, one or more cameras 518, etc. Each communication mechanism can include a wireless transmitter and receiver for transmitting and receiving wireless signals within one or more specific communication bands and subject to a specific communication protocol. The input devices allow a user to provide input signals to the mobile computing device 114. The input devices can include a touch-sensitive surface (e.g., a touch-sensitive screen), one or more hardware buttons or keys, a microphone, etc. The output devices present output information provided by the mobile computing device 114. The output devices can include one or more display devices, one or more speakers, etc. The camera(s) 518 allow the mobile computing device 114 to capture image and video information.

The mobile computing device 114 also includes one or more movement-determining mechanisms 520. The movement-determining mechanism(s) 520, in turn, include one or more location-determining mechanisms 522, an inertial measurement unit (IMU) 524, and one or more motion analysis mechanism 526.

The location-determining mechanism(s) 522 determine the location of the mobile computing device 114 at any given time. The location-determining mechanism(s) 522 are considered movement-determining mechanism(s) insofar as they can be used to track the movement of the mobile computing device 114 over time. For instance, the location-determining mechanism(s) 520 can include a GPS component that uses triangulation to determine the location of the mobile computing device 114 based on GPS signals transmitted by the GPS satellites. The location-determining mechanism(s) 522 can include other components that perform the same function based on signals transmitted by various terrestrial sources, such as cell towers, WI-FI access points, BLUETOOTH beacons, etc. The location-determining mechanism(s) 522 can also include an altimeter chip that determines the height of the mobile computing device 114 above a reference point, e.g., using a barometer (which detects changes in pressure with changes of altitude), and/or by leveraging the GPS component, etc.

In addition, or alternatively, the location-determining mechanism(s) 522 can include a geomagnetic component that determines the location of the mobile computing device 114 by detecting a magnetic field within an indoor environment. The geomagnetic component then determines a location that is associated with the detected magnetic field, e.g., by consulting a lookup table or a probabilistic analysis component. This component works based on the assumption that different locations in a building have unique magnetic signatures. That is, the component finds the location having a pre-stored magnetic signature that matches the magnetic signature that has been detected at the current location.

In addition, or alternatively, the location-determining mechanism(s) 522 can use an optical technique to determine the location of the mobile computing device 114. For example, the location-determining mechanism(s) 522 can use the Simultaneous Location and Mapping (SLAM) technique. That technique involves iteratively creating a map of the physical environment based on visual features detected by one or more video cameras associated with the mobile computing device 114. The technique then determines the current position of the mobile computing device 114 by matching a currently-detected set of visual features with features specified by the map.

In addition, or alternatively, the location-determining mechanism(s) 522 can use a dead-reckoning technique to determine the position of the mobile computing device 114. A dead-reckoning technique involves determining the position of the mobile computing device 114 by incrementally updating the position of the mobile computing device 114 at it moves through a physical environment, e.g., based on signals provided by its IMU 524.

The IMU 524 itself determines the motion exhibited by the mobile computing device 114. The IMU 524 can include one or more accelerometers, one or more gyroscopes, one or more magnetometers, etc. The IMU 524 can determine the movement of the mobile computing device 114 in six degrees of freedom.

The motion analysis mechanism(s) 526 determine the type of movement exhibited by the mobile computing device 114 and/or the transition from one type of movement to another (such as waking to driving, remaining still to moving, etc.). The motion analysis mechanism(s) 526 perform this task by operating on raw movement data provided by the location-determining mechanism(s) 522 and/or the IMU 524.

In one approach, the motion analysis mechanism(s) 526 can use any type of pattern-matching technology that compares a stream of raw movement data with telltale patterns associated with known types of movement. For example, the motion analysis mechanism(s) 526 can determine that the user is traveling in a motorized vehicle if the rate of change in the user's position exceeds a prescribed threshold. Similarly, the motion analysis mechanism(s) 526 can detect that the user is at rest when the raw movement data shows an extent of motion below a prescribed threshold, and/or a change in position below a prescribed threshold. These determinations depend on discrete rules. Alternatively, or in addition, the motion analysis mechanism(s) 526 can use a machine-trained model to perform its analysis (such as a Recurrent Neural Network (RNN), etc.). The motion analysis mechanism(s) 526 can determine that a motion-related transition has occurred when it detects a new kind of motion, with respect to a previously-prevailing kind of motion. The motion analysis mechanism(s) 526 can provide output signals that identify a series of motion-related events, such as the type of movement that is currently being detected (such as WALKING=TRUE, which indicates that the user is currently walking), and/or the transition from one type of movement to another (such as STILL_STOP=TRUE, which indicates that the user has ceased a state of stasis and begun moving).

FIG. 5 also shows other movement capture mechanism(s) 410 described above that are not physically associated with the mobile computing device 114. These other movement capture mechanism(s) 410 include pressure sensors, optical sensors, video cameras and associated detection logic, etc. At least some of the other movement capture mechanism(s) 410 may be installed in the building 112. The other movement capture mechanism(s) 410 may interact with the backend system 506 via the wireless communication system 504, or directly via the computer network 508.

Finally, FIG. 5 indicates that any other kind of local computing device 528 may interact with the backend system 506 (and/or the mobile computing device 114). For example, the other local computing device 528 may correspond to a workstation personal computing device that a meeting organizer uses to set up a meeting. The other local computing device 528 may interact with the backend system 506 via the wireless communication system 504, or directly via a hardwired connection to the computer network 508.

The functionality shown in FIG. 4 can be distributed among the resources shown in FIG. 5 in any manner. For example, in one case, the backend system 506 implements all of the functionality associated with the visit-logging tool 102, the scheduling tool 106, and the crowdsourcing tool 104. In another case, the each mobile computing device and/or each local computing device can implement aspects of the functionality shown in FIG. 4. For example, the mobile computing device 114 can implement aspects of the visit state machine 412 and/or aspects of the UI component 414 provided by the visit-logging tool 102. Similarly, the other local computing device 528 can implement some or all aspects of the calendar system 422. In general, it may be said that the one or more computing devices (servers, mobile computing devices, other local computing devices, etc.) can implement the functions shown in FIG. 4.

Figure 6:
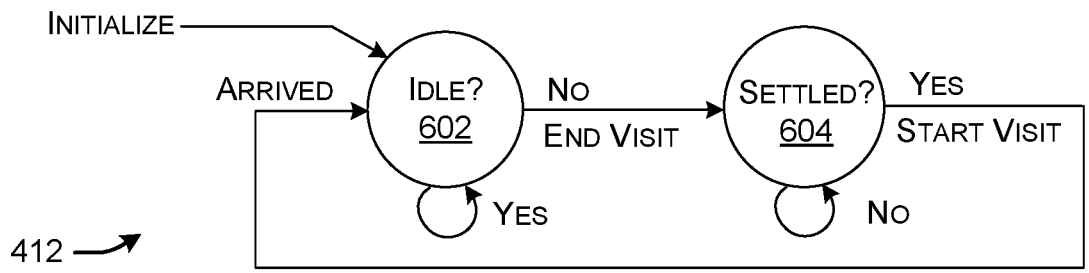
FIG. 6 shows an illustrative visit state machine used by the visit-logging tool of FIG. 4.

FIG. 6 shows one example of the visit state machine 412 introduced in FIG. 4. The visit state machine 412 generally analyzes movement data provided by the movement-related signals to identify each candidate visit that the user has made. In one case, the visit state machine 412 uses a decision component 602 to determine when the user has stopped moving and come to a rest for a prescribed amount of time. This event marks the beginning of a visit at an identified visit location. The visit state machine 412 uses a decision component 604 to determine when the user subsequently moves away from the stable visit location. This event marks the end of a visit at the identified visit location. A candidate visit corresponds to the time spent between the starting (arrival) and ending (departure) states.

The visit state machine 412 can use various environment-specific techniques to make the above-described determinations. In one implementation, the visit state machine 412 can make use of at least one state that involves setting up a perimeter (e.g., a geofence) around a current location of the mobile computing device 114. For instance, the perimeter may correspond to a circular perimeter around the current location having a prescribed environment-specific radius. This state (or another state) then determines whether the user has moved outside of the perimeter.

In one implementation, the mobile computing device 114 determines whether it has moved outside of a perimeter using triangulation based on various terrestrial signal sources (such as cell towers, WI-FI access points, etc.). This method for determining location does not use as much power as GPS triangulation, but it also provides less accurate readings compared to GPS triangulation. Because of this relative inaccuracy, it is possible that the mobile computing device 114 can reach a false conclusion that it has moved outside a perimeter. For this reason, the mobile computing device 114 can use the more energy-costly GPS triangulation whenever it seeks to obtain a high-accuracy position determination, e.g., when it seeks to confirm the position of a destination, etc.

The visit state machine 412 can also make use of at least one state that involves starting a countdown timer. Using this countdown timer, the visit state machine 412 determines whether a movement condition has prevailed for more than a prescribed amount of time. For example, the visit state machine 412 can use a countdown timer to determine whether the user remains in motion for a prescribed amount of time; if so, the visit state machine 412 can make a determination using the GPS component whether the user has moved outside of a prescribed perimeter.

In other cases, the visit state machine 412 can apply different rules based on its detection of different types of motion. For example, the visit state machine 412 can apply a first rule to determine whether the user has arrived at a visit location when it is determined that the user is traveling in a vehicle. It can use a second rule to determine whether the user has arrived at a visit location when it is determined that the user is traveling by foot. These rules can vary by using different parameters (e.g., perimeter sizes, timeout periods, etc.) and/or different decision logic.

Additional information regarding one implementation of a visit state machine can be found in co-pending U.S. patent application Ser. No. 16/213,264 to Ghatak, et al., filed on Dec. 7, 2018, and entitled "Computer-Implemented Detection of a Work-Related Visit Based on Data from Movement-Sensing Mechanism(s)." This application is incorporated herein in its entirety by reference.

Figure 7:
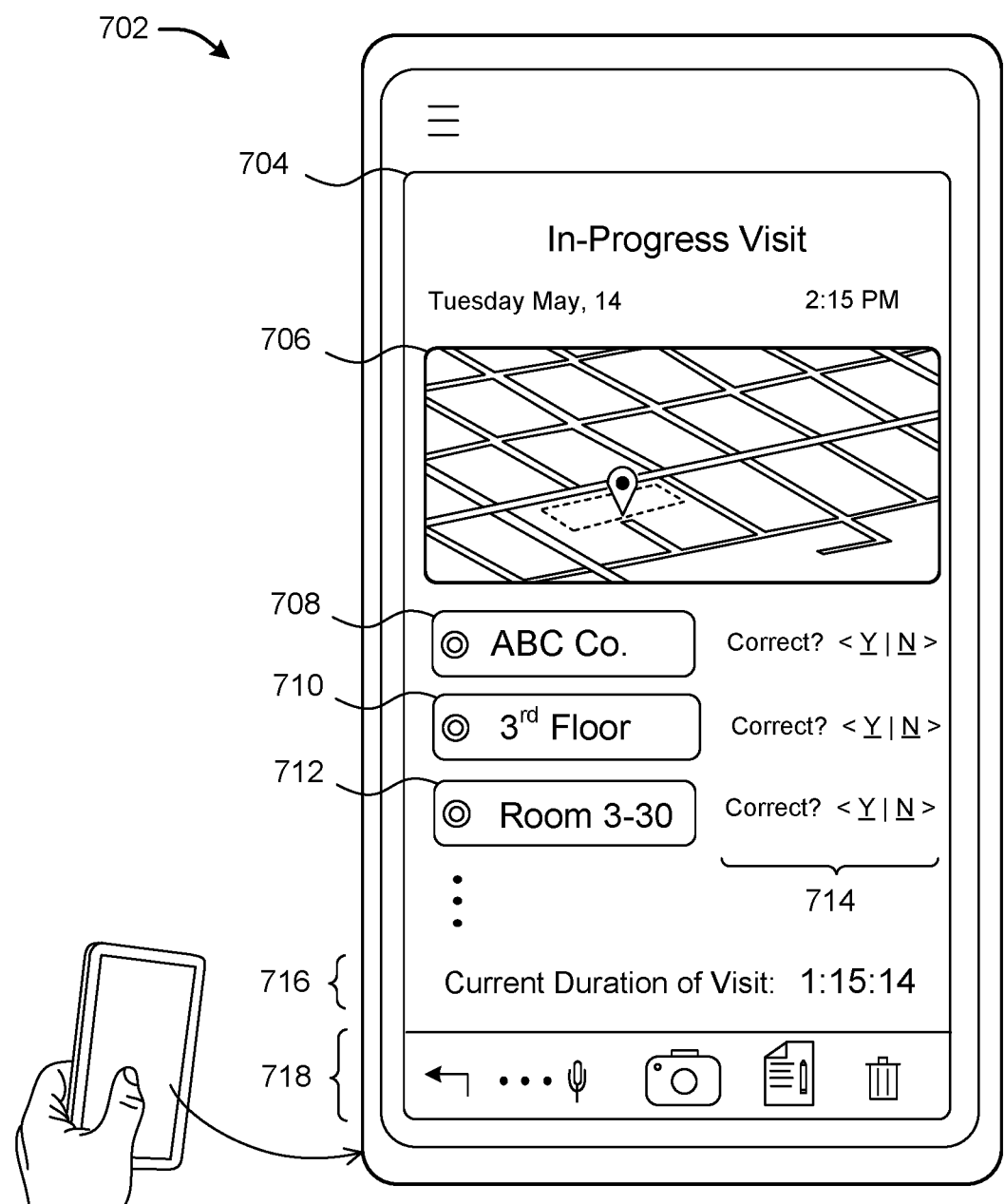
FIG. 7 shows a user interface presentation generated by the visit-logging tool of FIG. 4.

FIG. 7 shows a user interface presentation 702 generated by the UI component 414 of the visit-logging tool 102 of FIG. 4. The UI presentation 702 presents a page 704 of information regarding an ongoing visit, meaning a visit that has not yet terminated. That is, the visit state machine 412 determines that a visit has commenced when the user arrives at a location and remains there for a prescribed amount of time; the visit is considered ongoing when the visit state machine 412 has not yet detected the user's departure from that location. The UI presentation 702 can present a similar UI presentation for any completed visit based on its visit data stored in the data store 416.

The visit-logging tool 102 can present a map snippet 706 that shows the current location of the user. The visit-logging tool 102 can determine the general coordinates of the user's position using any location-determining mechanism described above, such as a GPS component. In a field 708, the visit-logging component 102 can also show the name associated with the user's general location. The visit-logging component 102 can determine the name, in turn, by using a lookup table to map the coordinates of the user's position to name information.

In some cases, the visit-logging tool 102 may be unable to determine the user's position within a building at this juncture of time. But in the case shown in FIG. 7, the visit-logging tool 102 presents floor and room information in fields 710 and 712, respectively. In one implementation, the visit-logging tool 102 identifies the floor and room information based on fine-grained position information generated by the crowdsourcing tool 104 and stored in the data store 120. The UI presentation 702 optionally includes graphical controls 714 that allow the user to provide feedback as to the accuracy of the identified name, floor, and room information. Finally, the visit-logging tool 102 provides information regarding the current duration of the ongoing visit in a field 716.

The UI presentation 702 optionally presents icons in a section 718 associated with respective commands. For instance, the user may interact with these icons to return to a home page, to add audio notes to the visit data associated with the ongoing visit, to add one or more images to the visit data, to add text-based notes to the visit data, and to delete the visit data, respectively, and so on.

Figure 8:
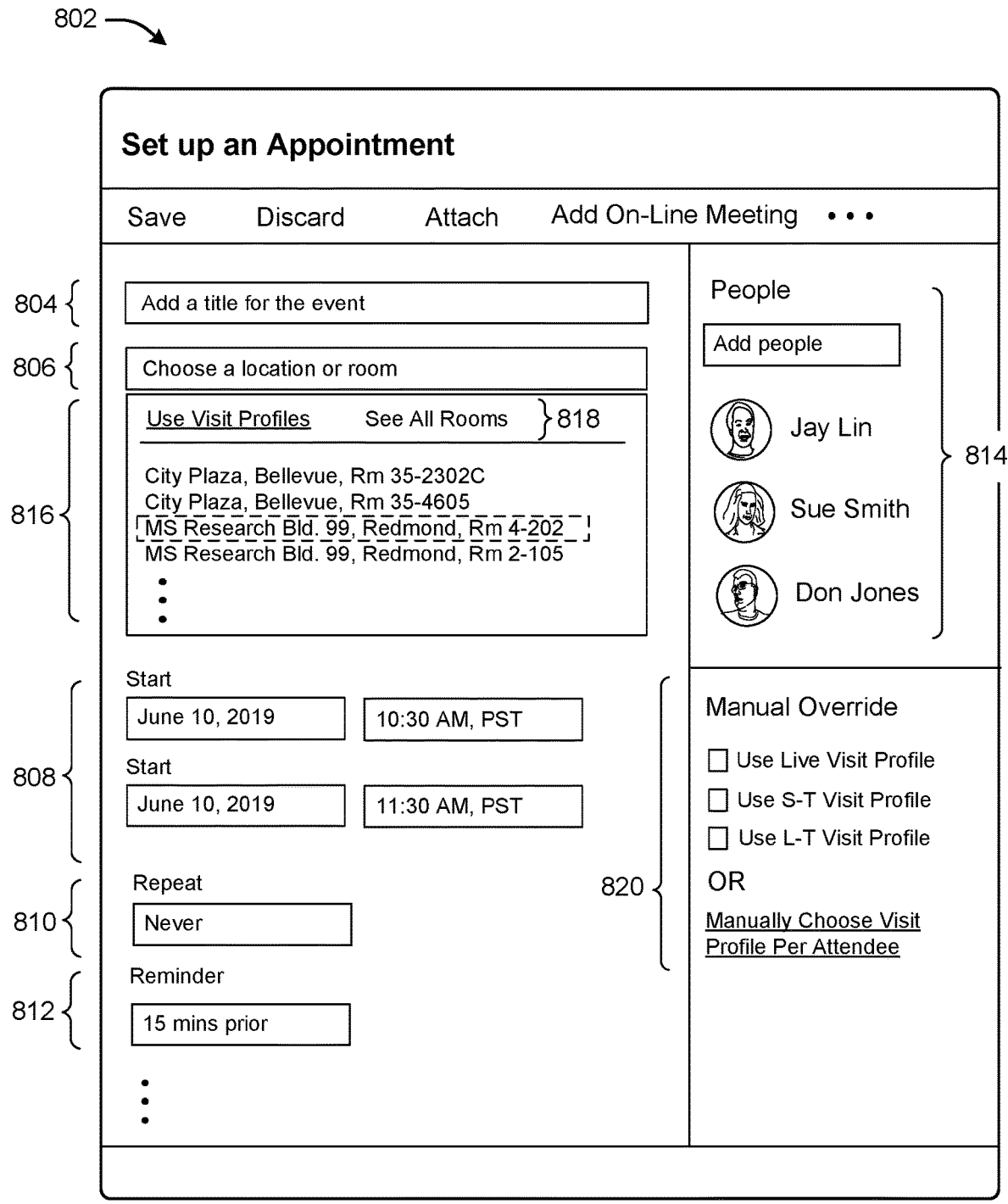
FIG. 8 shows a user interface presentation generated by a calendar system, which is an element of the scheduling tool of FIG. 4.

FIG. 8 shows a UI presentation 802 generated by the UI component 424 of the calendar system 422 of FIG. 4. The UI presentation 802 includes various graphical controls for entering data regarding a meeting being planned by an organizer. Those graphical controls include: a graphical control 804 for identifying the title of the meeting; a graphical control 806 for specifying the room location of the meeting; a graphical control 808 for specifying the starting time and ending time of the meeting; a graphical control 810 for specifying whether the meeting is recurring or not; a graphical control 812 for specifying when a reminder regarding the meeting is to be sent to the attendees; and a graphical control 814 that specifies the attendees of the meeting.

The room-recommending component 426 presents information regarding recommended meetings in a field 816. The field 816 also includes a graphical control that allows a user to pick any recommended room, e.g., by clicking on it with a mouse or touching its display information as presented by a touch-sensitive screen. This will cause the UI component 414 to populate the name of the chosen room in the input box of the graphical control 806.

The field 816 also includes a graphical control 818 that instructs the room-recommending component 426 to use visit profiles associated with the attendees to generate the room recommendations. If the user does not select this option, the room-recommending component 426 uses any default algorithm to recommend rooms. For instance, the room-recommending component 426 can display the n rooms that the organizer last chose to conduct prior meetings, e.g., as selected in n prior respective scheduling sessions.

As explained above, the room-recommending component 426 can automatically choose a visit profile for each attendee based on one or more factors. In addition, the UI presentation 802 can include a graphical control 820 that allows the organizer to explicitly select the kind of visit profile to be used for the entire set of attendees, e.g., by specifying that the short-term profile of each attendee should be used. Alternatively, the organizer can interact with the graphical control 820 to explicitly specify the type of visit profile to be used for each individual attendee.

Figure 9:
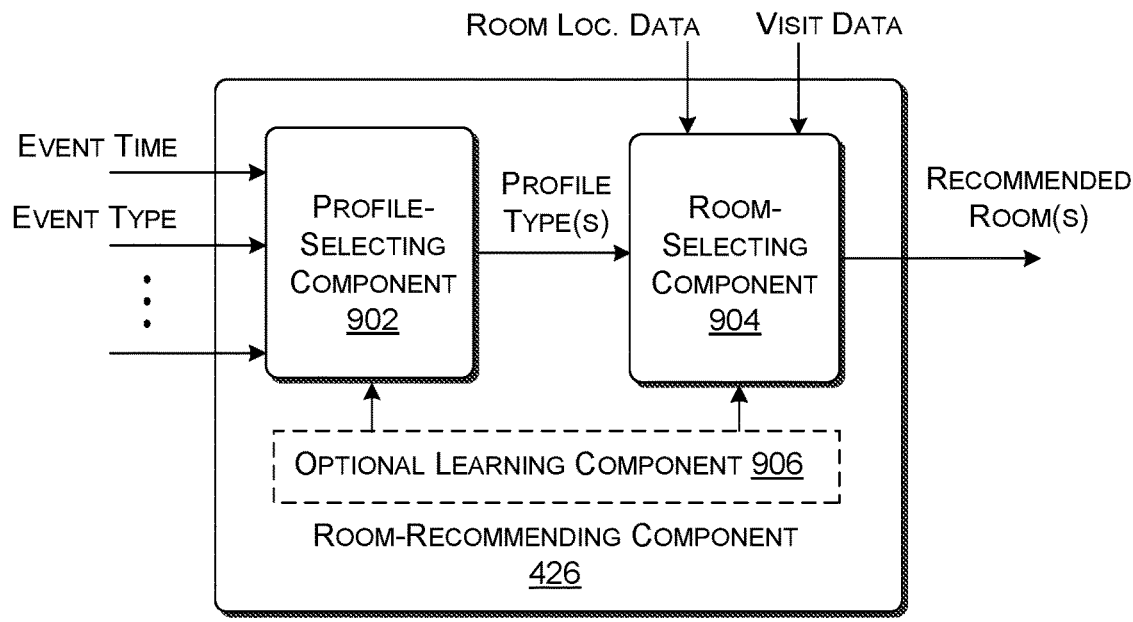
FIG. 9 shows a room-recommending component, which is another element of the scheduling tool of FIG. 4.

FIG. 9 shows one implementation of the room-recommending component 426, which is part of the calendar system 422 of FIG. 4. The room-recommending component 426 includes a profile-selecting component 902 that operates as described above. That is, in one implementation, the profile-selecting component 902 selects the live visit profile for an attendee if the proposed meeting time occurs two hours or less from the current time. It selects the short-term visit profile if the proposed meeting time occurs two days or less from the current time, but no less than two hours. It selects the long-term visit profile if: (a) the type of meeting being scheduled is a recurring meeting; or (b) the proposed meeting time occurs more than two days from the current time. The selected visit profile are collectively referred to as visit profile information below.

More generally, the profile-selecting component 902 can take into account plural characteristics regarding the proposed meeting and/or the attendees in selecting a visit profile to be used in proposing candidate meeting rooms. That is, the profile-selecting component 902 as described above takes into consideration the time of occurrence of the meeting and the recurring/not-recurring status of the meeting. But the profile-selecting component 902 can also take into account the subject matter of the meeting in selecting a meeting profile, as reflected by the meeting organizer's explicit selection of a subject matter label, and/or by key terms in the title of the meeting, and/or by key terms that appear anywhere in the meeting invitation, etc. The profile-selecting component 902 can also take into account the length of the meeting, the number of attendees, etc. The profile-selecting component 902 can also take into account the preferences of the attendees and/or the norms of the attendees' organization, as reflected by previously-stored preference information.

Further note that, in the above example, the profile-selecting component 902 selects the same kind of visit profile for each attendee to a meeting. But in another implementation, the profile-selecting component 902 can apply one or more factors to potentially select different kinds of visit profiles for the attendees to the same meeting, e.g., based on preference information associated with individual attendees.

A room-selecting component 904 performs the task of selecting one or more candidate rooms based on the visit profile information and other factors. First consider the case in which the visit profile information reveals that the attendees' visits form a single cluster associated with a single location. For instance, the visit profile information may indicate that all of the visits recently conducted by the attendees are associated with a single building, or a set of buildings on the same campus, and that any deviation from this prevailing pattern is below an environment-specific threshold value. In that case, the room-selecting component 904 can pick n candidate meeting rooms that are available and that are mutually convenient for the attendees to reach. More formally stated, the room-selecting component 904 can first find the meeting room that the attendees can reach with the shortest aggregate travel time. The room-selecting component 904 can then find the meeting room that the attendees can access with the next-shortest aggregate travel time. The room-selecting component 904 repeats this operation until it finds n candidate rooms. The room-recommending component 426 can optionally positively weight any attendee's contribution to the aggregate travel time based on any environment-specific factor; this will address the scenario in which the convenience of one attendee is more highly valued than the convenience of another attendee. The room-selecting component 904 also takes other factors into other considerations when choosing candidate meeting rooms, such as the number of attendees, the resource requirements of the attendees, etc. The meeting organizer can explicitly specify the resource requirements of the attendees when setting up the meeting. Alternatively, or in addition, the room-selecting component 904 can obtain this insight based on pre-stored preference information associated with the attendees. The room selecting component 904 also takes into consideration the characteristics of each candidate meeting room, such as its size, technical resources, accessibility to those with special needs, etc.

Next consider the example in which the visit profile information reveals that the attendees' visits form two or more distinct clusters associated with two or more respective locations that are separated by more than a prescribed distance. For example, the visit profile information may indicate that one group of attendees have predominantly made visits in Bellevue, Wash., while another group of attendees have predominantly made visits in San Francisco. In that case, the room-selecting component 904 can choose one or more candidate rooms in Bellevue, and one or more candidate rooms in San Francisco. The room-selecting component 904 can choose the location of each room for a work site (Bellevue or San Francisco) using the same logic described above, e.g., by finding one or more rooms in Bellevue that are mutually convenient for the Bellevue attendees, and finding one or more rooms in San Francisco that are convenient for the San Francisco attendees. In this case, the room-recommending component 426 can also automatically set up a virtual (online) meeting. This will allow the two groups of attendees to interact with each other during the meeting. Or the attendees may opt to conduct the meeting from their respective offices using the virtual meeting.

In the implementation set forth above, the profile-selecting component 902 uses discrete rules that define the time offsets that will invoke the various visit profiles, e.g., by specify that the long-term profile will be invoked when the planned meet occurs more than two days from the current time. In another implementation, the profile-selecting component 902 can rely on a learning component 906 to iteratively adjust the time offsets based on feedback from the organizer. For example, assume that an organizer who works in San Francisco is setting up a meeting for three days from now. But assume that the organizer is currently working in Bellevue, Wash. on an extended trip. Based on the above-described rules, the room-recommending component 426 will choose the long-term visit profile in recommending rooms, which will have the effect of inappropriately biasing the selection of rooms in favor of the San Francisco work site. The organizer can reject these recommendations by explicitly selecting the short-term profile, e.g., via the graphical control 820 shown in FIG. 8. In response, the learning component 906 can also increase the span of time for which the short-term profile will be invoked, e.g., by increasing it from 2 days to 2.25 days, etc. The profile-selecting component 902 will subsequently apply the updated threshold value of 2.25 in deciding whether to choose the long-term visit profile or the short-term visit profile. Upon receiving plural instances of feedback from the organizer, the learning component 906 will eventually converge on an optimal value that defines when the short-term profile will be triggered. The learning component 906 can perform the above-described type of iterative correction on any level of granularity. For example, the learning component 906 can provide custom rules for a company as a whole, for individual work sites associated with the company, or for individual employees who work for the company.

In another implementation, the learning component 906 can use a machine-trained model to choose the time offsets. In this case, the learning component 906 can use a training system that operates on a training dataset that includes: (a) the input parameter values specified by an organizer for each meeting; (b) the candidate rooms recommended by the room-recommending component 426 for each meeting; and (c) feedback that indicates whether the organizer and/or the attendees are satisfied with the candidate rooms. The training system can adjust the weights of its model to minimize the organizer's and/or attendees' dissatisfaction with the recommendations made by the room-recommending component 426.

In another implementation, the profile-selecting component 902 can use a rule-based algorithm or a machine-trained classification model to choose a visit profile for a proposed meeting based on plural characteristics associated with the meeting and/or the attendees. For example, a machine-trained model can generate a set of features that describe the timing of the meeting, the recurring/not-recurring status of the meeting, the subject matter of the meeting, etc. The machine-trained model can then map the features into a classification result that designates the type of visit profile to use in selecting candidate meeting rooms. The machine-trained model can correspond to any of a logistic regression model, a decision tree model, a support vector machine model, a Bayesian network model, a deep neural network model, etc. In this context, the learning component 906 can iteratively adjust the weights of the model to minimize the organizer's and/or attendees' dissatisfaction with the recommendations made by the room-recommending component 426.

Other components can make use of a learning component, such as the profile-determining component 418, the room-selecting component 904, etc. For example, the profile-determining component 418 can determine the length of time associated with each visit profile based on feedback from the organizer and/or the attendees. A learning component (not shown) can use discrete rules and/or a machine-trained model to perform this task. More specifically, in one case, the learning component can use a machine-trained clustering model to determine the sets of visits associated with the respective visit profiles, with the goal of minimizing dissatisfaction with room recommendations expressed by the organizer and/or attendees.

The room-selecting component 904 can use a machine-trained model to choose a set of meeting rooms. For instance, the room-selecting component 904 can generate plural features for each meeting room candidate that describe its characteristics, e.g., location, resources, size, etc. The room-selecting component 904 can generate other features that describe the attributes of the attendees, such as their selected visit profiles, home office locations, preferences, disabilities, etc. The room-selecting component 904 can then use the machine-trained model to assign a score to each candidate meeting room based on the features. The room-selecting component 904 can then select the set of available candidate meeting rooms having the best scores.

Figure 10:
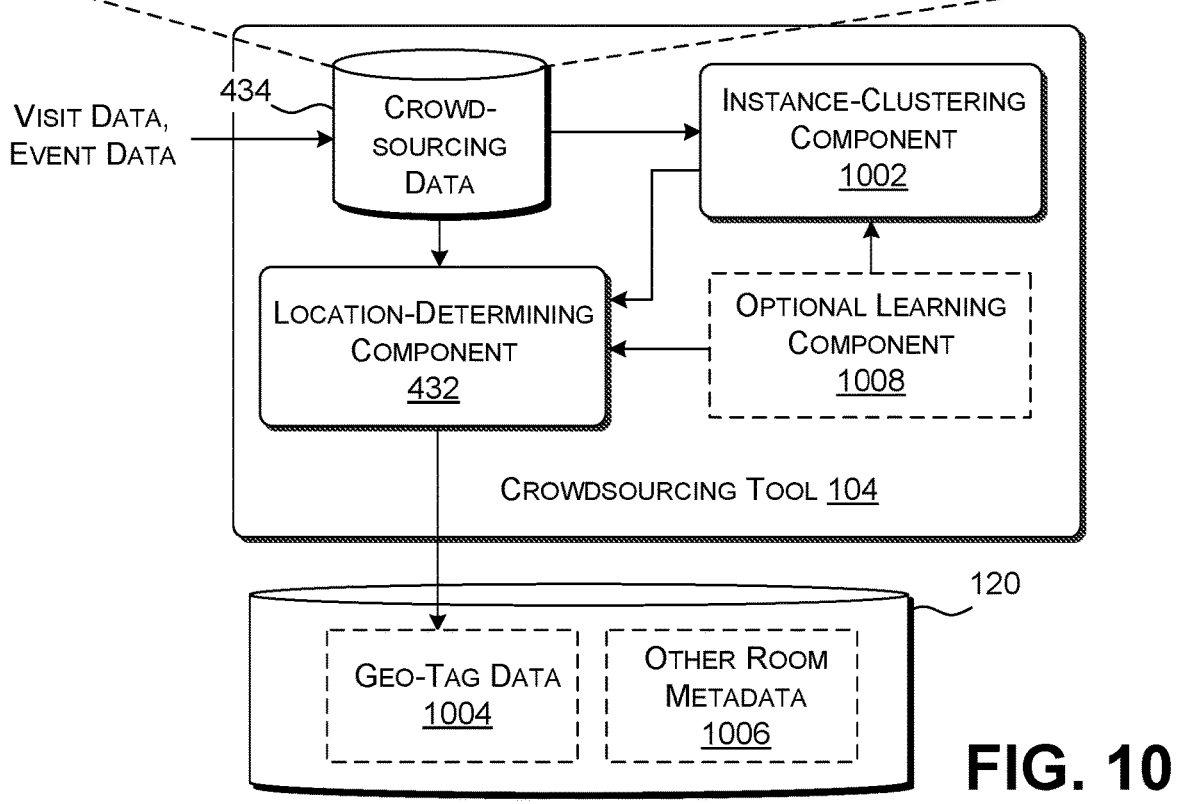
FIG. 10 shows one implementation of the crowdsourcing tool of FIG. 4.

FIG. 10 shows one implementation of the crowdsourcing tool 104 of FIG. 4. The crowdsourcing tool 104 operates based on a set of instances of position-related information provided in a data store 434. The set of instances is also referred to in aggregate as crowdsourcing data. Each instance of position-related information reflects one or more movement-related values captured by the movement-determining mechanisms 406 when an attendee visits a meeting room for a scheduled meeting. For instance, an instance of position-related information can include latitude, longitude, and altitude measurements captured by an attendee's mobile computing device 114 during a meeting in a room X. In addition, an instance of position-related information can include one or more identifiers associated with one or more wireless signal sources associated with the meeting room X. For instance, one identifier can correspond to a router ID that the mobile computing device 114 detects when it is in meeting room X. Another identifier corresponds to a beacon ID that the mobile computing device 114 detects within the meeting room X, and so on. A detected identifier can be correlated with location information in those cases in which the position of each signal source has been previously recorded, along with its identifier. The above-described visit metadata is set forth in the spirit of illustration, not limitation; other implementations can capture additional movement-related values during an attendee's participation in a meeting within a room, such as values derived from geomagnetic measurements, captured image information, etc.

Other instances of position-related information describe movement-related values captured by other attendees to the same meeting held in the same room X. Still other instances of position-related information describe movement-related values associated with other meetings held in the same room X at other respective dates and times. Overall, the crowdsourcing data can be said to include a plurality of clusters of position-related information. Each such cluster includes a set of instances of position-related information captured by attendees to one or more meetings held in the same room.

For instance, the crowdsourcing data includes a set of instances of position-related information that pertain to a meeting room Y, a set of instances of position-related information that pertain to a meeting room Z, and so on.

The crowdsourcing tool 104 uses an instance-clustering component 1002 to identify each cluster of position-related information. In one case, the instance-clustering component 1002 can find position-related information pertaining to a particular room by first interrogating the data store 430 to identify all the meetings that have been scheduled for that room in a prescribed timeframe, such as the last two years. The instance-clustering component 1002 can then find the visit data in the data store 416 that pertains to these meetings, presuming that the meetings have already taken place.

For example, consider the case in which the event data in the data store 430 describes a meeting that is presumed to have taken place in the meeting room X at a particular time and on a particular date. Further assume that the meeting includes the attendee "George Smith," along with other attendees. The instance-clustering component 1002 can use this event metadata to find the visit data actually captured when this person (George Smith) attended the meeting in room X. The instance-clustering component 1002 performs this task by matching metadata associated with the meeting (as specified in the data store 430) with metadata associated with the actual visit (as specified in the data store 416). The instance-clustering component 1002 repeats this operation for all other visits to the same meeting room X, to thereby construct a cluster of instances of position-related information for that meeting room X.

A location-determining component 432 next uses a crowdsourcing operation to determine a geographical position associated with each meeting room. Again consider an illustrative meeting room X. To repeat, each instance of position-related information for this room X includes a group of one or more values, each of which provides evidence as to the geographical position of the room X. The location-determining component 432 finds that group of values in the set of instances of position-related information that is most prevalent. The location-determining component 432 then determines the geographical position of the meeting room X based on that group of values. Consider the concrete case in which one instance of position-related information describes a router ID of CX20392, an altitude reading of 312 feet, and so on. The location-clustering component 1002 will determine that this group of values is most prevalent if this combination occurs in the set with the greatest frequency. Two groups of values agree only when each of their constituent values agree, e.g., when the altitude value of a first group agrees with the altitude value of a second group, and when the router ID of the first group agrees with the router ID of the second group, and so on. The location-determining component 432 can optionally apply other rules to increase its confidence in the chosen group of values, e.g., by requiring that the best-matching group of values has a prevalence count that exceeds a prevalence count of a second-best-matching group of values by more than a prescribed amount.

In some cases, the location-determining component 432 can determine whether two values are equivalent when they satisfy an environment-specific degree of similarity. For example, the location-determining component 432 can determine that two altitude measurements are equivalent if they vary by no more than six inches. The location-determining component 432 can also weight each instance of position-related information based on the time it was captured, so as to incrementally reduce the relevance of each instance as it ages. This is useful, for instance, in that case in which a router is moved from a first meeting room X to a second meeting room Y. The location-determining component 432 can incrementally discount the readings that incorrectly indicate that the router is associated with room X as time progresses.

More generally stated, the crowdsourcing tool 104 can filter out noise in the instances of position-related information. For instance, consider the case in which an attendee participates from a meeting being held in room X in San Francisco from a remote location, e.g., by phoning in to the meeting. This person's corresponding instance of position-related information will designate a location other than San Francisco. But the crowdsourcing tool 104 will effectively ignore this instance of position-related information because it disagrees with most other position readings by attendees who physically attended meetings in the particular meeting room X in San Francisco.

The location-determining component 432 can compute a final geographical position of each meeting room by averaging values associated with matching instances of position-related information. For example, consider the case in which the most-prevalent group of values includes an altitude value, which can vary somewhat across the matching instances of position-related information (e.g., 312 feet, 311 feet, 312.5 feet, etc.). The location-determining component 432 can generate an average altitude value by averaging the altitude values over all of the matching instances of position-related information.

The crowdsourcing tool 104 stores information regarding the thus-determined geographical position of each meeting room in the data store 120. The crowdsourcing tool 104 can also update the geographical position for each meeting room as additional visit data pertaining to the meeting room is obtained and analyzed. In aggregate, these kinds of geographical positions constitute geo-tag data 1004. The data store 120 can also optionally store other metadata 1006 pertaining to each room. For example, the data store 120 can store information gleaned from a digital blueprint of a building (if available) and/or a spreadsheet that specifies the location of each meeting room. In some contexts, this other metadata 1006 can be relatively coarse, or even inaccurate. The room-recommending component 426 can rely on both the geo-tag data 1004 and the other metadata 1006 when recommending rooms. For instance, the room-recommending component 426 can use the geo-tag data 1004 to refine the location information specified in the other metadata 1006 for a room under consideration, e.g., by averaging the geo-tag data 1004 with the other metadata 1006, or by using the geo-tag data 1004 to replace inaccurate other metadata 1006, etc. In early stages in which insufficient crowdsourcing data has been collected, however, the room-recommending component 426 can rely primarily on the other metadata 1006. In the case in which other metadata 1006 does not exist, the crowdsourcing tool 104 can progressive build the room location data from "scratch."

In another implementation, the instance-clustering component 1002 can adjust its operation based on one or more parameter values provided by a learning component 1008. The location-determining component 432 can similarly adjust its operation based on one or more parameter values provided by the learning component 1008. The learning component 1008, in turn, can algorithmically adjust the parameter values based on feedback from attendees. That feedback specifies whether the room locations identified by the crowdsourcing tool 104 are correct or incorrect.

In another implementation, the learning component 1008 can produce one or more machine-trained models for use by the instance-clustering component 1002 and/or the location-determining component 432. For example, the learning component 1008 can use a training system that produces a clustering model (e.g., a k-means clustering model) for use by the instance-clustering component 1002. Such a training system attempts to produce clusters of instances of position-related information that minimize the number of incorrect geographical positions attributed to rooms.

B. Illustrative Processes

Figure 11:
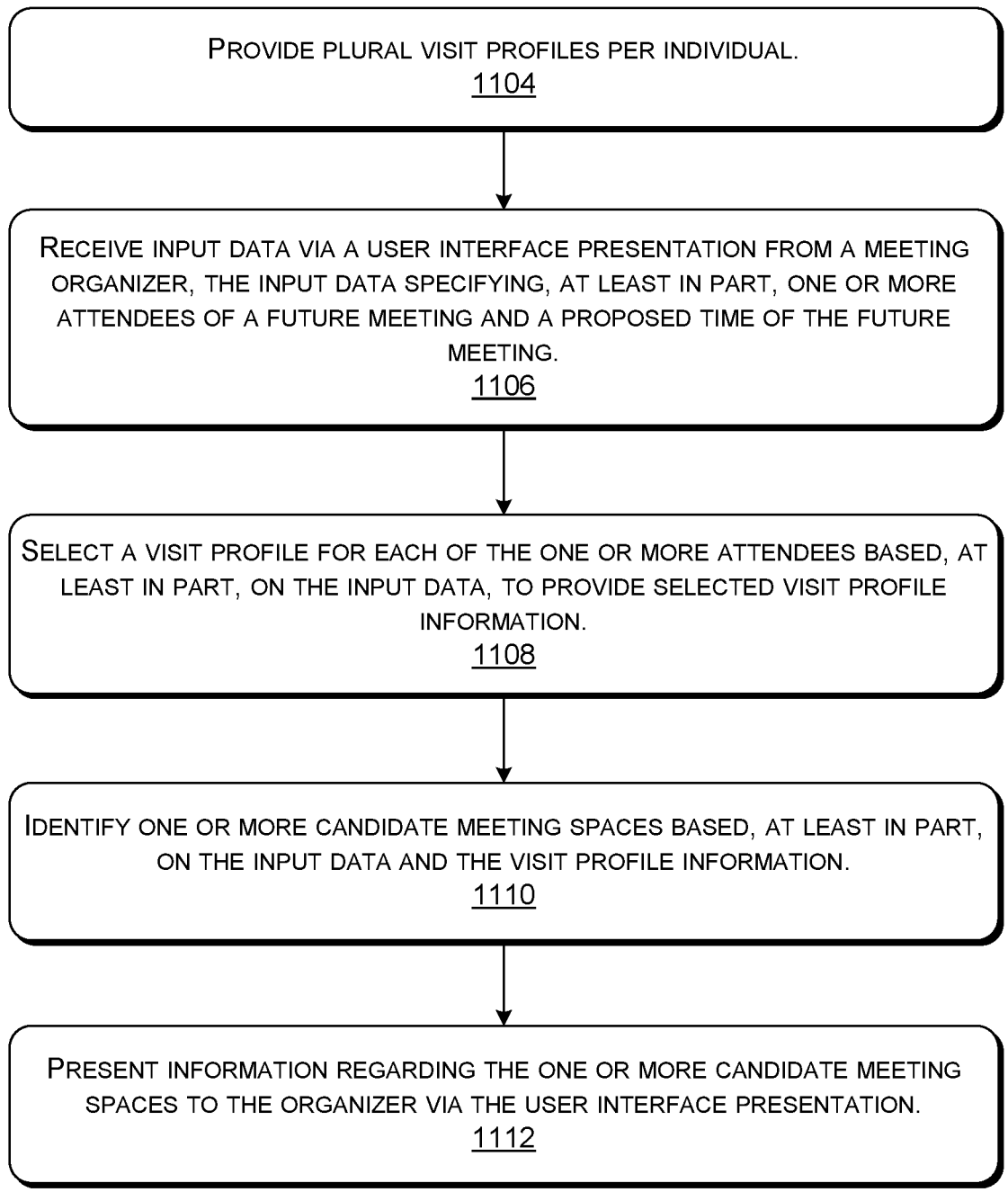
FIG. 11 is a flowchart that provides an overview of a room recommending-operation performed by the scheduling tool of FIG. 4.
Figure 12:
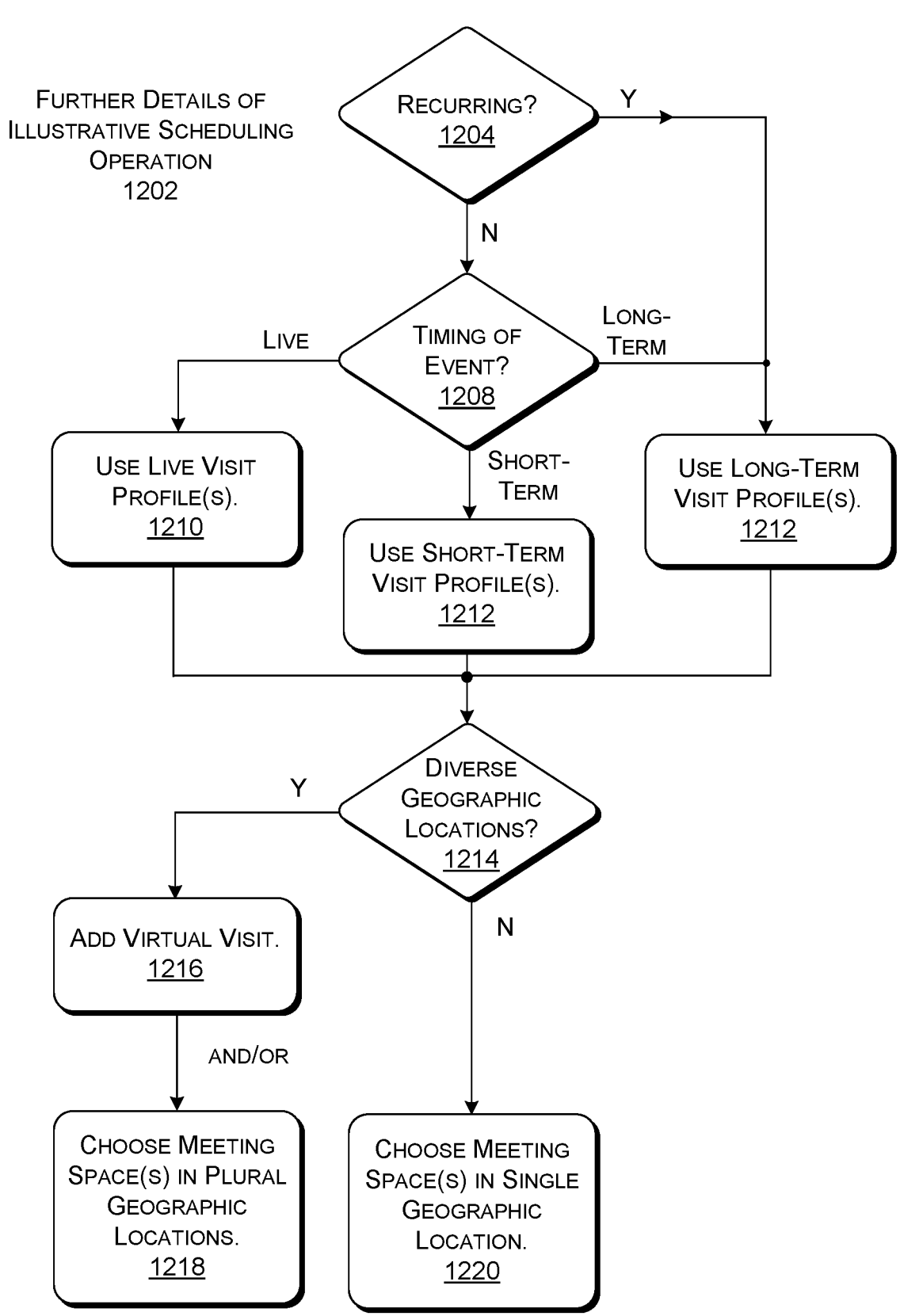
FIG. 12 is a flowchart that provides additional illustrative details regarding the room-recommending operation of FIG. 11.

FIGS. 11-13 show processes that explain the operation of the computing environment 402 of Section A in flowchart form. Since the principles underlying the operation of the computing environment 402 have already been described in Section A, certain operations will be addressed in summary fashion in this section. As noted in the prefatory part of the Detailed Description, each flowchart is expressed as a series of operations performed in a particular order. But the order of these operations is merely representative, and can be varied in any manner.

To begin with, FIG. 11 shows a process 1102 that provides an overview of a room-recommending operation performed by the scheduling tool 106 of FIGS. 4 and 9. In block 1104, the scheduling tool 106 generates plural visit profiles per individual. This operation may involve actively generating the different visit profiles, e.g., by identifying a subset of visits for each visit profile. Or it may represent the fact that the visit data in the data store 416 contains respective subsets of visits associated with different visit profiles.

In block 1106, the scheduling tool 106 receives input data from a meeting organizer via one or more controls of a user interface presentation. The input data specifies, at least in part, one or more attendees of a future meeting and a selected meeting time of the future meeting. In block 1108, the scheduling tool 106 selects a visit profile for each of the attendees based, at least in part, on the input data, to provide selected visit profile information. In block 1110, the scheduling tool 106 identifies one or more candidate meeting spaces based, at least in part, on the input data and the visit profile information. In block 1112, the scheduling tool 106 presents information regarding the candidate meeting spaces to the organizer via the user interface presentation.

FIG. 12 shows a process 1202 that provides additional illustrative details regarding the room-recommending process 1102 of FIG. 11. In block 1204, the room-recommending component 426 determines whether the meeting being set up by the organizer is recurring. If so, in block 1206, the room-recommending component 426 chooses the long-term visit profile for each attendee of the meeting.

In block 1208, the room-recommending component 426 determines the timing of the proposed meeting in relation to the current time. In block 1210, the room-recommending component 426 chooses the live visit profile for each attendee if the meeting time is two hours or less from the current time. In block 1212, the room-recommending component 426 chooses the short-term visit profile if the meeting time is two days or less from the current time, but not less than two hours from the current time. In block 1206, the room-recommending component 426 chooses the long-term visit profile if the meeting time is more than two days from the current time.

FIG. 12 indicates that the process 1202 takes into account the time of the meeting and the recurring/non-recurring status of the meeting to choose a meeting profile. But more generally, the process 1202 can take into account plural characteristics regarding a proposed meeting when selecting the visit profile(s) associated with the attendees (that is, beyond the time of the meeting time and the recurring/non-recurring status of the meeting).

In block 1214, the room-recommending component 426 determines whether the chosen visit profile information indicates that two or more attendees are separated by more than a prescribed distance. If so, in block 1216, the room-recommending component 426 sets up a supplemental virtual (online) meeting. In block 1218, the room-recommending component 426 optionally chooses one or more available meeting rooms in each of the identified locations. If block 1214 is answered in the negative, then, in block 1220, the room-recommending component 426 chooses one or more available meeting rooms in a single geographical location. For example, the room-recommending component 426 can chose a set of candidate meeting rooms that are mutually convenient to the attendees of the meeting, e.g., by minimizing the aggregate distance that the attendees are expected to travel to reach the meeting rooms.

Again, the process 1202 can take into account additional factors in choosing a set of candidate meeting rooms beyond those specified in blocks 1214-1220. For instance, the process 1202 can take into consideration the size, resources, etc. of each candidate meeting room, the preferences of the attendees, etc.

FIG. 13 shows a process 1320 that provides an overview of a crowdsourcing operation performed by the crowdsourcing tool 104 of FIGS. 4 and 10. The crowdsourcing tool 104 perform this process 1302 for each meeting space in a set of meeting spaces, to determine a geographical position of the meeting space. In block 1304, the crowdsourcing tool 104 collects a set of instances of position-related information captured during one or more prior visits to the meeting space made by one or more individuals. Each instance of position-related information includes one or more movement-related values captured by one or more movement-determining mechanisms 406, in which each movement-related value provides evidence as to a location of the candidate meeting space. At least one movement-determining mechanism is associated with a mobile computing device 114 that accompanies an individual as the individual visits the meeting space. In block 1306, the crowdsourcing tool 104 identifies a group of one or more values that is most prevalent within the set of instances of position-related information. In block 1308, the crowdsourcing tool 104 determines the geographical position of the meeting space based on the group of values that is most prevalent.

C. Representative Computing Functionality

Figure 14:
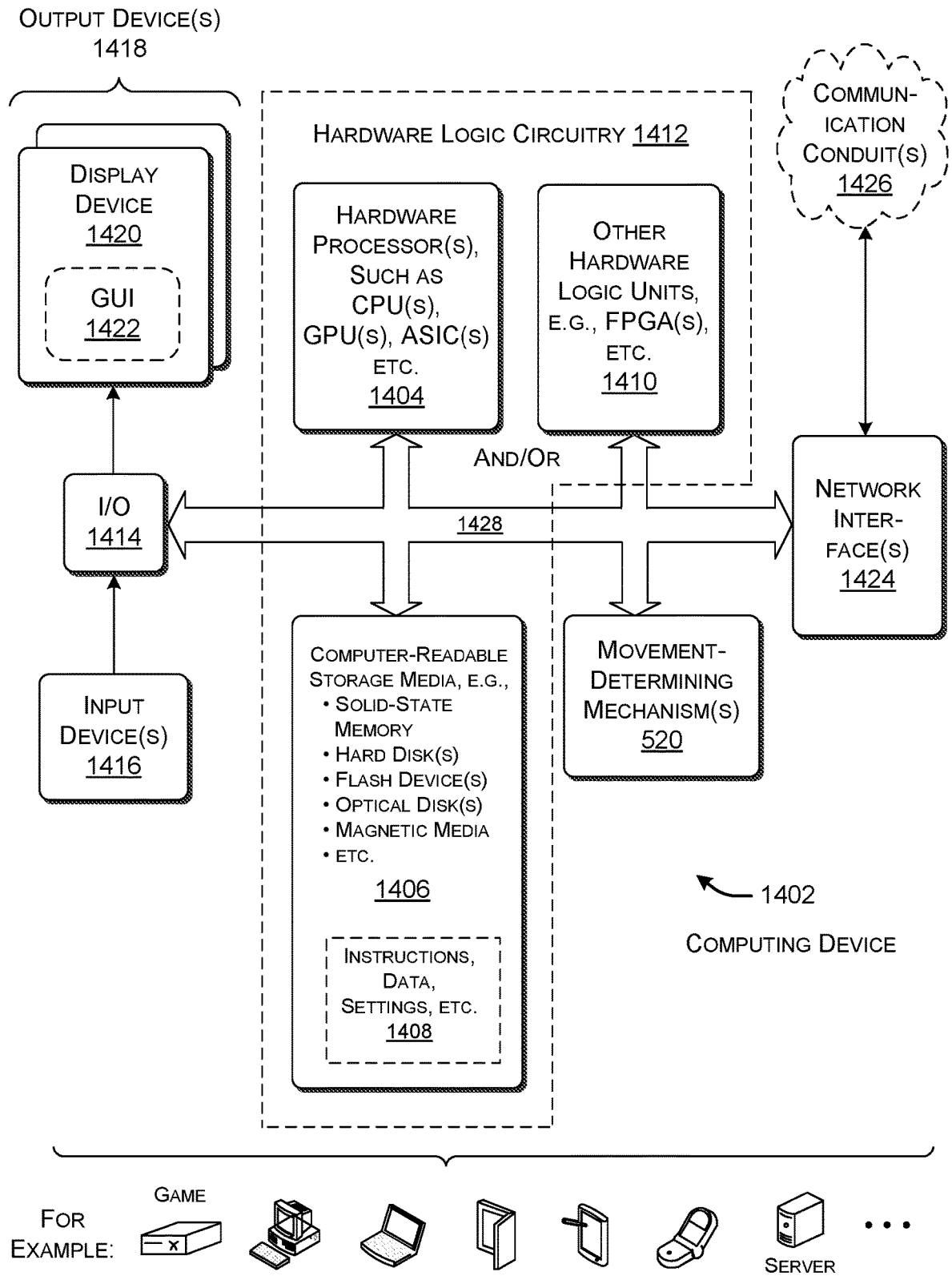
FIG. 14 shows an illustrative type of computing device that can be used to implement any aspect of the features shown in the foregoing drawings.

FIG. 14 shows a computing device 1402 that can be used to implement any aspect of the mechanisms set forth in the above-described figures. For instance, with reference to FIG. 5, the type of computing device 1402 shown in FIG. 14 can be used to implement the mobile computing device 114, the other local computing device 528, or any sever in the backend system 506. In all cases, the computing device 1402 represents a physical and tangible processing mechanism.

The computing device 1402 can include one or more hardware processors 1404. The hardware processor(s) 1402 can include, without limitation, one or more Central Processing Units (CPUs), and/or one or more Graphics Processing Units (GPUs), and/or one or more Application Specific Integrated Circuits (ASICs), etc. More generally, any hardware processor can correspond to a general-purpose processing unit or an application-specific processor unit.

The computing device 1402 can also include computer-readable storage media 1406, corresponding to one or more computer-readable media hardware units. The computer-readable storage media 1406 retains any kind of information 1408, such as machine-readable instructions, settings, data, etc. Without limitation, for instance, the computer-readable storage media 1406 may include one or more solid-state devices, one or more magnetic hard disks, one or more optical disks, magnetic tape, and so on. Any instance of the computer-readable storage media 1406 can use any technology for storing and retrieving information. Further, any instance of the computer-readable storage media 1406 may represent a fixed or removable unit of the computing device 1402. Further, any instance of the computer-readable storage media 1406 may provide volatile or non-volatile retention of information.

The computing device 1402 can utilize any instance of the computer-readable storage media 1406 in different ways. For example, any instance of the computer-readable storage media 1406 may represent a hardware memory unit (such as Random Access Memory (RAM)) for storing transient information during execution of a program by the computing device 1402, and/or a hardware storage unit (such as a hard disk) for retaining/archiving information on a more permanent basis. In the latter case, the computing device 1402 also includes one or more drive mechanisms (not shown) for storing and retrieving information from an instance of the computer-readable storage media 1406.

The computing device 1402 may perform any of the functions described above when the hardware processor(s) 1404 carry out computer-readable instructions stored in any instance of the computer-readable storage media 1406. For instance, the computing device 1402 may carry out computer-readable instructions to perform each block of the processes described in Section B.

Alternatively, or in addition, the computing device 1402 may rely on one or more other hardware logic units 1410 to perform operations using a task-specific collection of logic gates. For instance, the hardware logic unit(s) 1410 may include a fixed configuration of hardware logic gates, e.g., that are created and set at the time of manufacture, and thereafter unalterable. Alternatively, or in addition, the other hardware logic unit(s) 1410 may include a collection of programmable hardware logic gates that can be set to perform different application-specific tasks. The latter category of devices includes, but is not limited to Programmable Array Logic Devices (PALs), Generic Array Logic Devices (GALs), Complex Programmable Logic Devices (CPLDs), Field-Programmable Gate Arrays (FPGAs), etc.

FIG. 14 generally indicates that hardware logic circuitry 1412 includes any combination of the hardware processor(s) 1404, the computer-readable storage media 1406, and/or the other hardware logic unit(s) 1410. That is, the computing device 1402 can employ any combination of the hardware processor(s) 1404 that execute machine-readable instructions provided in the computer-readable storage media 1406, and/or one or more other hardware logic unit(s) 1410 that perform operations using a fixed and/or programmable collection of hardware logic gates. More generally stated, the hardware logic circuitry 1412 corresponds to one or more hardware logic units of any type(s) that perform operations based on logic stored in and/or otherwise embodied in the hardware logic unit(s).

In some cases (e.g., in the case in which the computing device 1402 represents a mobile computing device), the computing device 1402 includes one or more movement-determining mechanism(s) 520 described above with reference to FIG. 5.

In some cases (e.g., in the case in which the computing device 1402 represents a user computing device), the computing device 1402 also includes an input/output interface 1414 for receiving various inputs (via input devices 1416), and for providing various outputs (via output devices 1418). Illustrative input devices include a keyboard device, a mouse input device, a touchscreen input device, a digitizing pad, one or more static image cameras, one or more video cameras, one or more depth camera systems, one or more microphones, a voice recognition mechanism, and so on. One particular output mechanism may include a display device 1420 and an associated graphical user interface presentation (GUI) 1422. The display device 1420 may correspond to a liquid crystal display device, a light-emitting diode display (LED) device, a cathode ray tube device, a projection mechanism, etc. The computing device 1402 can also include one or more network interfaces 1424 for exchanging data with other devices via one or more communication conduits 1426. One or more communication buses 1428 communicatively couple the above-described units together.

The communication conduit(s) 1426 can be implemented in any manner, e.g., by a local area computer network, a wide area computer network (e.g., the Internet), point-to-point connections, etc., or any combination thereof. The communication conduit(s) 1426 can include any combination of hardwired links, wireless links, routers, gateway functionality, name servers, etc., governed by any protocol or combination of protocols.

FIG. 14 shows the computing device 1402 as being composed of a discrete collection of separate units. In some cases, the collection of units may correspond to discrete hardware units provided in a computing device chassis having any form factor. FIG. 14 shows illustrative form factors in its bottom portion. In other cases, the computing device 1402 can include a hardware logic unit that integrates the functions of two or more of the units shown in FIG. 1. For instance, the computing device 1402 can include a system on a chip (SoC or SOC), corresponding to an integrated circuit that combines the functions of two or more of the units shown in FIG. 14.

The following summary provides a non-exhaustive set of illustrative aspects of the technology set forth herein.

According to a first aspect, one or more computing devices for identifying candidate meeting spaces are described. The computing device(s) include hardware logic circuitry having: (a) one or more hardware processors that perform operations by executing machine-readable instructions stored in a memory, and/or (b) one or more other hardware logic units that perform operations using a task-specific collection of logic gates. The operations include providing plural visit profiles per individual. Each visit profile is based on visit data associated with the individual, the visit data describing one or more visits made by the individual. The visit data is automatically generated based on movement-related signals provided by one or more movement-determining mechanisms, at least one movement-determining mechanism being associated with a mobile computing device that accompanies the individual as the individual moves. Each visit profile is based on visits made the individual over a prescribed timespan. And the plural visit profiles are associated with different respective timespans.

The method also includes: receiving input data from a meeting organizer via one or more controls of a user interface presentation, the input data specifying, at least in part, one or more attendees of a future meeting and a selected meeting time of the future meeting; selecting a visit profile for each of the one or more attendees based, at least in part, on the input data, to provide selected visit profile information; identifying one or more candidate meeting spaces based, at least in part, on the input data and the visit profile information; and presenting information regarding the one or more candidate meeting spaces to the organizer via the user interface presentation.

According to a second aspect, the plural visit profiles for an individual include: a live visit profile that describes a current visit being made by the individual or a last visit made by the individual; a short-term visit profile that describes a subset of visits made by the individual over a first span of time ending at a current time; and a long-term visit profile that describes another subset of visits made by the individual over a second span of time ending at the current time, the second span of time being longer than the first span of time.

According to a third aspect, relating to the second aspect, the operation of selecting a visit profile includes: selecting the live visit profile for each attendee when the selected meeting time is separated from the current time by a first time offset or less; selecting the short-term visit profile for each attendee when the selected meeting time is separated from the current time by a second time offset or less, but no sooner than the first time offset; and selecting the long-term visit profile for each attendee when the selected meeting time is separated from the current time by a time offset that is greater than the second offset, wherein the second time offset is greater than the first time offset.

According to a fourth aspect, the input data also specifies one or more characteristics of the future meeting other than attendance of the future meeting and the selected meeting time of the future meeting. Further, the operation of selecting a visit profile includes selecting a visit profile based, in part, on the one or more other characteristics.

According to a fifth aspect, relating to the fourth aspect, one other characteristic specifies whether the future meeting will be recurring. Further, the operation of selecting a visit profile includes selecting a long-term visit profile for an attendee when the input data indicates that the future meeting will be recurring.

According to a sixth aspect, the operation of identifying one or more candidate meeting spaces includes: determining that selected visit profiles of the attendees are associated with a same identified geographical location; and choosing one or more candidate meeting spaces associated with the identified location.

According to a seventh aspect, the operation of identifying one or more candidate meeting spaces includes: determining that a selected visit profile associated with a first attendee is associated with a first geographical location; determining that a selected visit profile associated with a second attendee is associated a second geographical location; determining that the first geographical location is separated from the second geographical location by more than a prescribed distance; and in response to the operation of determining that the first and second geographical locations are separated by more than the prescribed distance, choosing one or more candidate meeting spaces associated with the first geographical location and one or more candidate meeting spaces associated with the second geographical location.

According to an eighth aspect, relating to the seventh aspect, the operations further include choosing a virtual meeting space in response to determining that the first and second geographical locations are separated by more than the prescribed distance.

According to a ninth aspect, the operations further include, in a preliminary processing stage, generating a geographical position for each candidate meeting space by: collecting a set of instances of position-related information captured during one or more prior visits to the candidate meeting space made by one or more individuals, each instance of position-related information including a group of one or more movement-related values provided by the one or more movement-determining mechanisms, each movement-related value providing evidence as to a location of the candidate meeting space; identifying a group of values that is most prevalent within the set of position-related information; and determining a geographical position of the candidate meeting space based on the group of values that is most prevalent.

According to a tenth aspect, relating to the ninth aspect, at least one movement-determining mechanism determines a movement-related value based on detection, in the candidate meeting room, of an identifier emitted by a wireless signal source.

According to an eleventh aspect, relating to the ninth aspect, the operation of identifying a group of values involves weighting each instance of position-related information by a time at which it was captured, such that an instance of position-related information captured at a given time is promoted over an instance of position-related information captured at an earlier time.

According to a twelfth aspect, a method is described for recommending one or more meeting spaces, performed by one or more computing devices. The method includes, for each meeting space in a set of meeting spaces, performing a crowdsourcing operation to determine a geographical position of the meeting space by: automatically collecting a set of instances of position-related information captured during one or more prior visits to the meeting space made by one or more individuals, each instance of position-related information including a group of one or more movement-related values provided by one or more movement-determining mechanisms, at least one movement-determining mechanism being associated with a mobile computing device that accompanies an individual as the individual visits the meeting space, each movement-related value providing evidence as to a location of the candidate meeting space; identifying a group of values that is most prevalent within the set of instances of position-related information; and determining the geographical position of the meeting space based on the group of values that is most prevalent. The method further includes: receiving input data from a meeting organizer via one or more controls of a user interface presentation, the input data specifying, at least in part, one or more attendees of a future meeting and a selected meeting time of the future meeting; identifying one or more candidate meeting spaces based, at least in part, on the input data and geographical positions associated with the meeting spaces, as determined by the crowdsourcing operation; and presenting information regarding the one or more candidate meeting spaces to the organizer via the user interface presentation.

According to a thirteenth aspect, relating to the twelfth aspect, the operation of identifying a group of values involves weighting each instance of position-related information by a time at which it was captured, such that an instance of position-related information captured at a given time is promoted over an instance of position-related information captured at an earlier time.

According to a fourteenth aspect, relating to the twelfth aspect, the method further includes: selecting a visit profile for each of the one or more attendees based, at least in part, on the input data, to provide selected visit profile information, each visit profile being based on visit data associated with an attendee, the visit data describing one or more visits made by the attendee, the visit data being automatically generated based on movement-related signals provided by the one or more movement-determining mechanisms. The operation of identifying one or more candidate meeting spaces is also based, at least in part, on the visit profile information.

According to a fifteenth aspect, relating to the fourteenth aspect, the operation of selecting the visit profile for the attendee involves selecting the visit profile from plural visit profiles. The plural visit profiles include: a live visit profile that describes a current visit being made by the attendee or a last visit made by the attendee; a short-term visit profile that describes a subset of visits made by the attendee over a first span of time ending at a current time; and a long-term visit profile that describes another subset of visits made by the attendee over a second span of time ending at the current time, the second span of time being longer than the first span of time.

According to a sixteenth aspect, relating to the fifteenth aspect, the operation of selecting a visit profile includes: selecting the live visit profile for each attendee when the selected meeting time is separated from the current time by a first time offset or less; selecting the short-term visit profile for each attendee when the selected meeting time is separated from the current time by a second time offset or less, but no sooner than the first time offset; and selecting the long-term visit profile for each attendee when the selected meeting time is separated from the current time by a time offset that is greater than the second offset. The second time offset is greater than the first time offset.

According to a seventeenth aspect, relating to the fourteenth aspect, the input data also specifies one or more characteristics of the future meeting other than attendance of the future meeting and the selected meeting time of the future meeting. The operation of selecting a visit profile includes selecting a visit profile based, in part, on the one or more other characteristics.

According to an eighteenth aspect, relating to the seventeenth aspect, one other characteristic specifies whether the future meeting will be recurring. Further, the operation of selecting a visit profile includes selecting a long-term visit profile for an attendee when the input data indicates that the future meeting will be recurring.

According to a nineteenth aspect, relating to the twelfth aspect, the operation of determining of the geographical position of the meeting space is also based on preexisting location information that is provided through some other process than the crowdsourcing operation.

According to a twentieth aspect, a computer-readable storage medium is for storing computer-readable instructions. The computer-readable instructions, when executed by one or more hardware processors, perform a method that includes providing plural visit profiles per individual. Each visit profile is based on visit data associated with the individual, the visit data describing one or more visits made by the individual. The visit data is automatically generated based on movement-related signals provided by one or more movement-determining mechanisms, at least one movement-determining mechanism being associated with a mobile computing device that accompanies the individual as the individual moves. The plural visit profiles include: a live visit profile that describes a current visit being made by the individual or a last visit made by the individual; a short-term visit profile that describes a subset of visits made by the individual over a first span of time ending at a current time; and a long-term visit profile that describes another subset of visits made by the individual over a second span of time ending at the current time, the second span of time being longer than the first span of time. The method further includes: receiving input data from a meeting organizer via one or more controls of a user interface presentation, the input data specifying, at least in part, one or more attendees of a future meeting and a selected meeting time of the future meeting; and selecting a visit profile for each of the one or more attendees based, at least in part, on the input data, to provide selected visit profile information. The operation of selecting involves: selecting the live visit profile for each attendee when the selected meeting time is separated from the current time by a first time offset or less; selecting the short-term visit profile for each attendee when the selected meeting time is separated from the current time by a second time offset or less, but no sooner than the first time offset; and selecting the long-term visit profile for each attendee when the selected meeting time is separated from the current time by a time offset that is greater than the second offset. The second time offset is greater than the first time offset. The method further includes: identifying one or more candidate meeting spaces based, at least in part, on the input data, the visit profile information, and crowdsourced geographical position data associated with each candidate meeting space; and presenting information regarding the one or more candidate meeting spaces to the organizer via the user interface presentation.

A twenty-first aspect corresponds to any combination (e.g., any logically consistent permutation or subset) of the above-referenced first through twentieth aspects.

A twenty-second aspect corresponds to any method counterpart, device counterpart, system counterpart, means-plus-function counterpart, computer-readable storage medium counterpart, data structure counterpart, article of manufacture counterpart, graphical user interface presentation counterpart, etc. associated with the first through twenty-first aspects.

In closing, the functionality described herein can employ various mechanisms to ensure that any user data is handled in a manner that conforms to applicable laws, social norms, and the expectations and preferences of individual users. For example, the functionality can allow a user to expressly opt in to (and then expressly opt out of) the provisions of the functionality. The functionality can also provide suitable security mechanisms to ensure the privacy of the user data (such as data-sanitizing mechanisms, encryption mechanisms, password-protection mechanisms, etc.).

Further, the description may have set forth various concepts in the context of illustrative challenges or problems. This manner of explanation is not intended to suggest that others have appreciated and/or articulated the challenges or problems in the manner specified herein. Further, this manner of explanation is not intended to suggest that the subject matter recited in the claims is limited to solving the identified challenges or problems; that is, the subject matter in the claims may be applied in the context of challenges or problems other than those described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computing devices for identifying candidate meeting spaces, comprising:
hardware logic circuitry, the hardware logic circuitry including: (a) one or more hardware processors that perform operations by executing machine-readable instructions stored in a memory, and/or (b) one or more other hardware logic units that perform the operations using a task-specific collection of logic gates, the operations including:
providing plural visit profiles per individual,
each visit profile being based on visit data associated with the individual, the visit data describing one or more visits made by the individual,
the visit data being automatically generated by:
collecting movement-related signals provided by one or more movement-determining devices, at least one movement-determining device being associated with a mobile computing device that accompanies the individual as the individual moves, said at least one movement-determining device detecting a location of the mobile computing device based on wireless signals received from one or more wireless signal sources; and
using a state machine implemented by the hardware logic circuitry to determine visits made by the individual based on the movement-related signals, each visit being demarcated by an arrival at a particular location by the individual, and subsequent departure from the particular location by the individual,
each visit profile being based on visits made by the individual over a prescribed timespan,
the plural visit profiles being associated with different respective timespans,
receiving input data from a meeting organizer via one or more controls of a user interface presentation, the input data specifying, at least in part, one or more attendees of a future meeting and a selected meeting time of the future meeting;
triggering selection of a visit profile for each of said one or more attendees based, at least in part, on the selected meeting time specified in the input data, to provide selected visit profile information;
identifying one or more candidate meeting spaces based, at least in part, on the input data and locations of visits conveyed by the visit profile information;
presenting information regarding said one or more candidate meeting spaces to the organizer via the user interface presentation; and
notifying said one or more attendees of at least one selected candidate meeting space, chosen from among said one or more candidate meeting spaces.

2. The one or more computing devices of claim 1, wherein the plural visit profiles for the individual include:
a live visit profile that describes a current visit being made by the individual or a last visit made by the individual;
a short-term visit profile that describes a subset of visits made by the individual over a first span of time ending at a current time; and
a long-term visit profile that describes another subset of visits made by the individual over a second span of time ending at the current time, the second span of time being longer than the first span of time.

3. The one or more computing devices of claim 2, wherein said triggering selection of a visit profile includes:
selecting the live visit profile for each attendee when the selected meeting time is separated from the current time by a first time offset or less;
selecting the short-term visit profile for each attendee when the selected meeting time is separated from the current time by a second time offset or less, but no sooner than the first time offset; and
selecting the long-term visit profile for each attendee when the selected meeting time is separated from the current time by a time offset that is greater than the second offset,
wherein the second time offset is greater than the first time offset.

4. The one or more computing devices of claim 1, wherein the input data also specifies one or more characteristics of the future meeting other than attendance of the future meeting and the selected meeting time of the future meeting; and
said triggering selection of a visit profile includes selecting a visit profile based, in part, on said one or more other characteristics.

5. The one or more computing devices of claim 4, wherein one other characteristic specifies whether the future meeting will be recurring; and
said triggering selection of a visit profile includes selecting a long-term visit profile for each attendee when the input data indicates that the future meeting will be recurring.

6. The one or more computing devices of claim 1, wherein said identifying one or more candidate meeting spaces comprises:
determining that selected visit profiles of said one or more attendees are associated with a same identified geographical location; and
choosing one or more candidate meeting spaces associated with the identified geographical location.

7. The one or more computing devices of claim 1, wherein said identifying one or more candidate meeting spaces comprises:
determining that a selected visit profile associated with a first attendee is associated with a first geographical location;
determining that a selected visit profile associated with a second attendee is associated a second geographical location;
determining that the first geographical location is separated from the second geographical location by more than a prescribed distance; and
in response to said determining that the first and second geographical locations are separated by more than the prescribed distance, choosing one or more candidate meeting spaces associated with the first geographical location and one or more candidate meeting spaces associated with the second geographical location.

8. The one or more computing devices of claim 7, wherein the operations further include choosing a virtual meeting space in response to determining that the first and second geographical locations are separated by more than the prescribed distance.

9. The one or more computing devices of claim 1, wherein the operations further include, in a preliminary processing stage, generating a geographical position for each candidate meeting space by:
collecting a set of instances of position-related information captured during one or more prior visits to the candidate meeting space made by one or more individuals, each instance of position-related information including a group of one or more movement-related values provided by said one or more movement-determining devices, each movement-related value providing evidence as to a location of the candidate meeting space;

identifying a group of values that is most prevalent within the set of instances of position-related information; and determining a geographical position of the candidate meeting space based on the group of values that is most prevalent.

10. The one or more computing devices of claim 9, wherein at least one movement-determining device determines a movement-related value based on detection, in the candidate meeting space, of an identifier emitted by a wireless signal source.

11. The one or more computing devices of claim 9, wherein said identifying a group of values involves weighting each instance of position-related information by a time at which the instance of position-related information was captured, such that a particular instance of position-related information captured at a given time is promoted over another particular instance of position-related information captured at an earlier time.

12. A method for recommending one or more meeting spaces, performed by one or more computing devices, comprising:

for each meeting space in a set of meeting spaces, performing a crowdsourcing operation to determine a geographical position of the meeting space by:

interrogating a data store to identify meetings that have been scheduled for the meeting space in a prescribed timeframe, using metadata associated with the meetings to find stored visit data that pertains to the meetings, the visit data including a set of instances of position-related information previously captured during one or more prior visits to the meeting space made by one or more individuals, each instance of position-related information including a group of one or more movement-related values provided by one or more movement-determining devices, at least one movement-determining device being associated with a mobile computing device that accompanies an individual as the individual visits the meeting space, said at least one movement-determining device detecting a location of the mobile computing device based on wireless signals received from one or more wireless signal sources, each movement-related value providing evidence as to a location of the candidate meeting space;

identifying a group of values that is most prevalent within the set of instances of position-related information; and determining the geographical position of the meeting space based on the group of values that is most prevalent;

receiving input data from a meeting organizer via one or more controls of a user interface presentation, the input data specifying, at least in part, one or more attendees of a future meeting and a selected meeting time of the future meeting;

identifying one or more candidate meeting spaces based, at least in part, on the input data and geographical positions associated with said one or more candidate meeting spaces, as determined by the crowdsourcing operation;

presenting information regarding said one or more candidate meeting spaces to the organizer via the user interface presentation; and notifying said one or more attendees of at least one selected candidate meeting space, chosen from among said one or more candidate meeting spaces.

13. The method of claim 12, wherein said identifying a group of values involves weighting each instance of position-related information by a time at which the instance of position-related information was captured, such that a particular instance of position-related information captured at a given time is promoted over another particular instance of position-related information captured at an earlier time.

14. The method of claim 12, wherein the method further includes:

selecting a visit profile for each of said one or more attendees based, at least in part, on the input data, to provide selected visit profile information, each visit profile being based on visit data associated with a particular attendee, the visit data describing one or more visits made by the particular attendee, the visit data being automatically generated based on movement-related signals provided by said one or more movement-determining devices, wherein said identifying one or more candidate meeting spaces is also based, at least in part, on the visit profile information.

15. The method of claim 14, wherein said selecting the visit profile for the particular attendee involves selecting the visit profile from plural visit profiles, the plural visit profiles including:

a live visit profile that describes a current visit being made by the particular attendee or a last visit made by the particular attendee;

a short-term visit profile that describes a subset of visits made by the particular attendee over a first span of time ending at a current time; and a long-term visit profile that describes another subset of visits made by the particular attendee over a second span of time ending at the current time, the second span of time being longer than the first span of time.

16. The method of claim 15, wherein said selecting a visit profile includes:

selecting the live visit profile for each attendee when the selected meeting time is separated from the current time by a first time offset or less;

selecting the short-term visit profile for each attendee when the selected meeting time is separated from the current time by a second time offset or less, but no sooner than the first time offset; and selecting the long-term visit profile for each attendee when the selected meeting time is separated from the current time by a time offset that is greater than the second offset, wherein the second time offset is greater than the first time offset.

17. The method of claim 14, wherein the input data also specifies one or more characteristics of the future meeting other than attendance of the future meeting and the selected meeting time of the future meeting; and said selecting a visit profile includes selecting a visit profile based, in part, on said one or more other characteristics.

18. The method of claim 17, wherein one other characteristic specifies whether the future meeting will be recurring; and said selecting a visit profile includes selecting a long-term visit profile for each attendee when the input data indicates that the future meeting will be recurring.

19. The method of claim 12, wherein said determining of the geographical position of the meeting space is also based on preexisting location information that is provided through some other process than the crowdsourcing operation.

20. A computer-readable storage medium for storing computer-readable instructions, the computer-readable instructions, when executed by one or more hardware processors, performing a method that comprises:

providing plural visit profiles per individual,
each visit profile being based on visit data associated with the individual, the visit data describing one or more visits made by the individual,
the visit data being automatically generated by:
collecting movement-related signals provided by one or more movement-determining devices, at least one movement-determining device being associated with a mobile computing device that accompanies the individual as the individual moves, said at least one movement-determining device detecting a location of the mobile computing device based on wireless signals received from one or more wireless signal sources; and
using a state machine to determine visits made by the individual based on the movement-related signals, each visit being demarcated by an arrival at a particular location by the individual, and subsequent departure from the particular location by the individual,
the plural visit profiles including:
a live visit profile that describes a current visit being made by the individual or a last visit made by the individual;
a short-term visit profile that describes a subset of visits made by the individual over a first span of time ending at a current time; and
a long-term visit profile that describes another subset of visits made by the individual over a second span of time ending at the current time, the second span of time being longer than the first span of time;
receiving input data from a meeting organizer via one or more controls of a user interface presentation, the input data specifying, at least in part, one or more attendees of a future meeting and a selected meeting time of the future meeting;
triggering selection of a visit profile for each of said one or more attendees based, at least in part, on the selected meeting time specified in the input data, to provide selected visit profile information, said triggering selection of a visit profile involving:
selecting the live visit profile for each attendee when the selected meeting time is separated from the current time by a first time offset or less;
selecting the short-term visit profile for each attendee when the selected meeting time is separated from the current time by a second time offset or less, but no sooner than the first time offset; and
selecting the long-term visit profile for each attendee when the selected meeting time is separated from the current time by a time offset that is greater than the second offset,
the second time offset being greater than the first time offset;
identifying one or more candidate meeting spaces based, at least in part, on the input data, locations of visits conveyed by the visit profile information, and crowdsourced geographical position data associated with each candidate meeting space; and
presenting information regarding said one or more candidate meeting spaces to the organizer via the user interface presentation.

* * * * *